(12) United States Patent
Adams et al.

(10) Patent No.: US 12,244,399 B2
(45) Date of Patent: Mar. 4, 2025

(54) TILTED EARTH-BASED ANTENNA SYSTEMS AND METHODS OF TILTING FOR COMMUNICATION WITH A SATELLITE SYSTEM

(71) Applicant: Space Exploration Technologies Corp., Hawthorne, CA (US)

(72) Inventors: Duncan E. Adams, Redmond, WA (US); David Milroy, Kirkland, WA (US); Jonathan François Cornelis Herman, Los Angeles, CA (US); Jessica D. Johnson, Redmond, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 18/437,044

(22) Filed: Feb. 8, 2024

(65) Prior Publication Data
US 2024/0187089 A1    Jun. 6, 2024

Related U.S. Application Data

(63) Continuation of application No. 18/123,879, filed on Mar. 20, 2023, now Pat. No. 11,909,506, which is a
(Continued)

(51) Int. Cl.
*H04B 7/185* (2006.01)

(52) U.S. Cl.
CPC ..... *H04B 7/18519* (2013.01); *H04B 7/18517* (2013.01); *H04B 7/18536* (2013.01);
(Continued)

(58) Field of Classification Search
CPC ............ H04B 7/18519; H04B 7/18517; H04B 7/18536; H04B 7/18547; H04B 7/18571; H04B 7/18573
See application file for complete search history.

(56) References Cited

U.S. PATENT DOCUMENTS

| 6,107,976 A | 8/2000 | Purinton |
| 6,111,542 A * | 8/2000 | Day ...................... H01Q 21/06 342/359 |

(Continued)

FOREIGN PATENT DOCUMENTS

| CN | 106558761 A | 4/2017 |
| CN | 109474324 A | 3/2019 |
| WO | 2006019290 A1 | 2/2006 |

OTHER PUBLICATIONS

International Search Report and Written Opinion dated Sep. 29, 2020, issued in corresponding International Application No. PCT/US2020/036003, filed Jun. 3, 2020, 10 pages.

*Primary Examiner* — Keith Ferguson
(74) *Attorney, Agent, or Firm* — Polsinelli PC

(57) ABSTRACT

In one embodiment of the present disclosure, a satellite communication system includes a satellite constellation including a plurality of satellites in non-geosynchronous orbit (non-GEO), wherein at least some of the plurality of satellites travel in a first orbital path at a first inclination, and an end point terminal having an earth-based geographic location, the end point terminal having an antenna system defining a field of regard for communicating with the satellite constellation, wherein the field of regard is a limited field of regard, wherein the field of regard is tilted from a non-tilted position to a tilted position, and wherein the tilt angle of the tilted position is a function of the latitude of the geographic location.

6 Claims, 21 Drawing Sheets

Related U.S. Application Data continuation of application No. 16/892,223, filed on Jun. 3, 2020, now Pat. No. 11,611,392.

(60) Provisional application No. 62/943,206, filed on Dec. 3, 2019, provisional application No. 62/856,730, filed on Jun. 3, 2019.

(52) U.S. Cl.
CPC ..... *H04B 7/18547* (2013.01); *H04B 7/18571* (2013.01); *H04B 7/18573* (2013.01)

(56) References Cited

U.S. PATENT DOCUMENTS

| | | |
|---|---|---|
| 6,759,995 B1 | 7/2004 | Speece |
| 11,075,456 B1 | 7/2021 | Henning et al. |
| 2002/0169578 A1 | 11/2002 | Yang |
| 2004/0150561 A1 | 8/2004 | Tillery et al. |
| 2009/0096603 A1 | 4/2009 | Langsweirdt et al. |
| 2010/0177012 A1 | 7/2010 | Morrow |
| 2011/0171901 A1 | 7/2011 | Wyler |
| 2014/0227985 A1 | 8/2014 | Sanford |
| 2015/0015453 A1 | 1/2015 | Puzella et al. |
| 2015/0229385 A1 | 8/2015 | Roos |
| 2015/0250022 A1 | 9/2015 | Kim et al. |
| 2018/0083365 A1 | 3/2018 | Hinman et al. |
| 2019/0181946 A1 | 6/2019 | Wendling |
| 2020/0127888 A1 | 4/2020 | Liu et al. |
| 2020/0365999 A1 | 11/2020 | Edenfield et al. |

\* cited by examiner

TILTED EARTH-BASED ANTENNA SYSTEMS AND METHODS OF TILTING FOR COMMUNICATION WITH A SATELLITE SYSTEM

CROSS REFERENCES TO RELATED APPLICATIONS

This application is a continuation of U.S. patent application Ser. No. 18/123,879, filed Mar. 20, 2023, entitled "TILTED EARTH-BASED ANTENNA SYSTEMS AND METHODS OF TILTING FOR COMMUNICATION WITH A SATELLITE SYSTEM", which is a continuation of U.S. patent application Ser. No. 16/892,223, filed Jun. 3, 2020, now U.S. Pat. No. 11,611,392, entitled "TILTED EARTH-BASED ANTENNA SYSTEMS AND METHODS OF TILTING FOR COMMUNICATION WITH A SATELLITE SYSTEM", which claims the benefit of U.S. Provisional Application Nos. 62/856,730, filed Jun. 3, 2019, entitled "ANTENNA HOUSING AND COMPONENTS FOR SAME", and 62/943,206, filed Dec. 3, 2019, entitled "TILTED EARTH-BASED ANTENNA SYSTEMS AND METHODS OF TILTING FOR COMMUNICATION WITH A SATELLITE SYSTEM", the disclosures of which are hereby expressly incorporated by reference in their entireties herein.

BACKGROUND

Communication satellites receive and transmit radio signals from and to the surface of Earth for the purpose of providing communication services. In conventional satellite technology, only a few locations on Earth were in view of a satellite at any given time to transmit and/or receive signals to and/or from a satellite. In more modern satellite technology, it is desirable for every place on Earth be provided communication services at all times, a capability which may be referred to as universal or global coverage. In addition to global coverage, some locations on Earth, such as densely populated areas, require more communication capacity than others.

For global coverage having reduced latency, communication systems may employ non-geostationary satellites. Geostationary-Earth orbit (GEO) satellites orbit the equator with an orbital period of exactly one day at a high altitude, flying approximately 35,786 km above mean sea level. Therefore, GEO satellites remain in the same area of the sky as viewed from a specific location on Earth. In contrast, non-geostationary satellites typically operate in low-Earth or mid-Earth orbit (LEO or MEO) and do not remain stationary relative to a specific location on Earth.

Satellite constellations are needed with improved global coverage and improved communication capacity without interfering with existing satellite communication systems. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a satellite communication system is provided. The system includes: a satellite constellation including a plurality of satellites in non-geosynchronous orbit (non-GEO), wherein at least some of the plurality of satellites travel in a first orbital path at a first inclination; and an end point terminal having an earth-based geographic location, the end point terminal having an antenna system defining a field of regard for communicating with the satellite constellation, wherein the field of regard is a limited field of regard, wherein the field of regard is tilted from a non-tilted position to a tilted position, and wherein the tilt angle of the tilted position is a function of the latitude of the geographic location.

In accordance with another embodiment of the present disclosure, a method of orienting an endpoint terminal for communicating with a non-GEO satellite constellation is provided. The method includes: determining a latitude location for an Earth-based endpoint terminal having a geographic location on Earth, wherein the endpoint terminal includes an antenna system defining a field of regard for communication with a satellite constellation including a plurality of satellites in non-geosynchronous orbit (non-GEO), wherein the field of regard is a limited field of regard; based on a first latitude location of the endpoint terminal, selecting a first tilt angle for the field of regard to adjust the field of regard from a non-tilted position to a first tilted position, wherein the first tilt angle is a function of the latitude of the geographic location; and tilting the field of regard to the selected first tilt angle to define a tilted field of regard.

In accordance with another embodiment of the present disclosure, a satellite communication system is provided. The system includes: a satellite constellation including a plurality of satellites in non-geosynchronous orbit (non-GEO), wherein at least some of the plurality of satellites travel in a first orbital path at a first inclination; and an end point terminal constellation including a plurality of Earth-based end point terminals, wherein each end point terminal has a different geographic locations on Earth, each end point terminal having an antenna system defining a field of regard for communicating with the satellite constellation, wherein the field of regard is a limited field of regard, wherein the field of regard is tilted from a non-tilted position to a tilted position, and wherein the tilted position is a function of the latitude of the geographic location, wherein a first end point terminal is located at a first geographic location and has a first tilt angle and a first tilt direction and wherein a second end point terminal is located at a second geographic location and has a second tilt angle and a second tilt direction.

In accordance with another embodiment of the present disclosure, a method of orienting an endpoint terminal constellation for communicating with a non-GEO satellite constellation is provided. The method includes: determining a latitude location for a first Earth-based endpoint terminal having a first geographic location on Earth, wherein the first endpoint terminal includes a first antenna system defining a first field of regard for communication with a satellite constellation including a plurality of satellites in non-geosynchronous orbit (non-GEO), wherein the first field of regard is a limited field of regard; based on a first latitude location of the first endpoint terminal, selecting a first tilt angle for the first field of regard to adjust the first field of regard from a first non-tilted position to a first tilted position, wherein the first tilt angle is a function of the latitude of the geographic location; tilting the field of regard to the selected first tilt angle to define a first tilted field of regard; determining a latitude location for a second Earth-based endpoint terminal having a second geographic location on Earth different from the first geographic location of the first endpoint terminal, wherein the second endpoint terminal includes a second antenna system defining a second field of regard for communication with a satellite constellation including a plurality of satellites in non-geosynchronous orbit (non-GEO), wherein the second field of regard is a limited field of regard; based on a second latitude location of the second endpoint terminal, selecting a second tilt angle for the second field of regard to adjust the second field of regard from a second non-tilted position to a second tilted position, wherein the second tilt angle is a function of the latitude of the second geographic location; and tilting the second field of regard to the selected second tilt angle to define a second tilted field of regard.

In accordance with any of the embodiments described herein, the satellite constellation may include a plurality of satellites in low Earth orbit (LEO).

In accordance with any of the embodiments described herein, the end point terminal may be located at a first geographic location between the equator and a northward latitude less than the first upper limiting latitude of an inclined orbital track, and the field of regard may be tilted northward to a first tilted position at the first geographic location in the northern hemisphere of the Earth.

In accordance with any of the embodiments described herein, the end point terminal may be located at a second geographic location between the equator and a northward latitude less than the first upper limiting latitude of an inclined orbital track, and the field of regard may be tilted northward to a second tilted position at the second geographic location in the northern hemisphere of the Earth, wherein the second tilted position is different than the first tilted position.

In accordance with any of the embodiments described herein, the end point terminal may be located at a first geographic location between the equator and a southward latitude less than the first lower limiting latitude of an inclined orbital track, and the field of regard may be tilted southward to a first tilted position at the first geographic location in the southward hemisphere of the Earth.

In accordance with any of the embodiments described herein, the end point terminal may be located at a second geographic location between the equator and a southward latitude less than the first lower limiting latitude of an inclined orbital track, and the field of regard may be tilted southward to a second tilted position at the second geographic location in the southern hemisphere of the Earth, wherein the second tilted position is different from the first tilted position.

In accordance with any of the embodiments described herein, the tilted position of the field of regard may be configured such that the field of regard has a reduced amount of overlap with a GEO-belt interference zone as compared to a field of regard of an end point terminal having a non-tilted position.

In accordance with any of the embodiments described herein, the tilted position of the field of regard may be configured such that the field of regard includes more satellites in the view than a field of regard of an end point terminal having a non-tilted position.

In accordance with any of the embodiments described herein, the GEO-belt interference zone may be in a range of +/−5 to 30 degrees from the GEO belt.

In accordance with any of the embodiments described herein, the tilt angle or selecting the tilt angle may be a function of a factor selected from the group consisting of the latitude location for the endpoint terminal, a longitude location of the endpoint terminal, obstructions, geological features, population density, an altitude of the end point terminal, a load balancing analysis of the satellite constellation, one or more angles of inclination of the satellite constellation, a geographical cell to which the end point terminal belongs, and combinations thereof.

In accordance with any of the embodiments described herein, the tilt angle or selecting the tilt angle may include degree of tilt and tilt direction, and wherein tilt direction is in north or south and east or west tilt directions.

In accordance with any of the embodiments described herein, the satellite constellation may include a plurality of satellites in low Earth orbit (LEO).

In accordance with any of the embodiments described herein, tilting the field of regard may reduce the amount of overlap of the field of regard with a GEO-belt interference zone as compared to a field of regard of an end point terminal having a non-tilted position.

In accordance with any of the embodiments described herein, tilting the field of regard may increase the number satellites in the view of the field of regard than a field of regard of an end point terminal having a non-tilted position.

In accordance with any of the embodiments described herein, the first and second end point terminals may be in the same geographic cell, and the first and second end point terminals may have the same tilt angle and tilt direction.

In accordance with any of the embodiments described herein, the first and second end point terminals may be in the same geographic cell, and the first and second end point terminals may have different tilt angles and/or tilt directions.

In accordance with any of the embodiments described herein, the first and second end point terminals may be in different geographic cells, and the first and second end point terminals may have the same tilt angle and tilt direction.

In accordance with any of the embodiments described herein, the first and second end point terminals may be in different geographic cells, and the first and second end point terminals may have different tilt angles and/or tilt directions.

In accordance with any of the embodiments described herein, the tilt direction of each end point terminal may be in north or south directions, or north or south and east or west tilted orientations.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
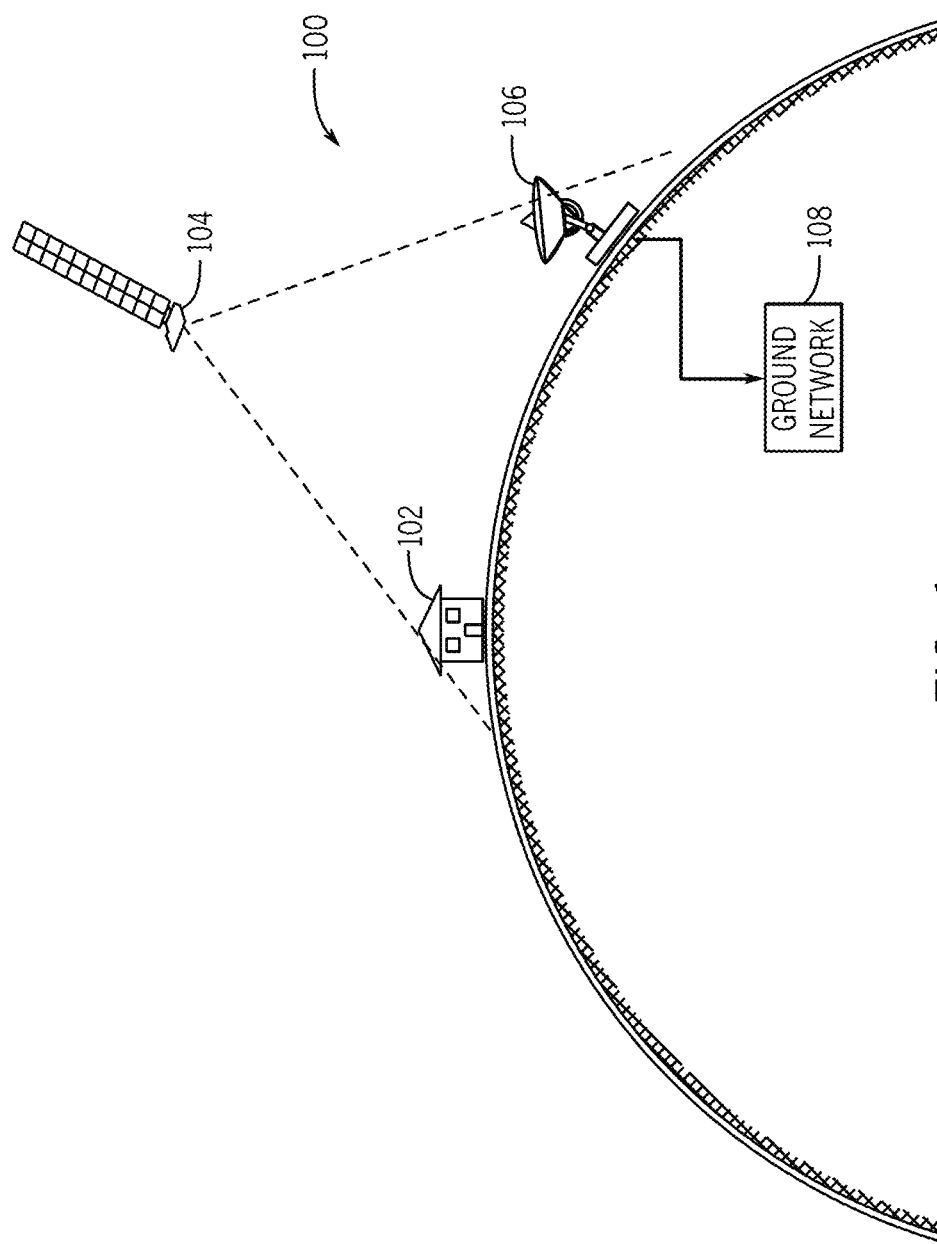
FIG. 1 is a not-to-scale schematic diagram illustrating a simple example of communication in a satellite communication system.

Systems are currently being deployed to provide high-bandwidth, low-latency network communication via constellations of satellites in low Earth orbit (LEO). FIG. 1 is a not-to-scale schematic diagram that illustrates a simple example of communication in such a system 100. An endpoint terminal 102 is installed at a house, a business, a vehicle, or another location where it is desired to obtain communication access via a network of satellites. A communication path is established between the endpoint terminal 102 and a first satellite 104. In the illustrated embodiment, the first satellite 104, in turn, establishes a communication path with a gateway terminal 106. In another embodiment, the first satellite 104 may establish a communication path with another satellite prior to communication with a gateway terminal 106. The gateway terminal 106 is physically connected via fiber optic, Ethernet, or another physical connection to a ground network 108. The ground network 108 may be any type of network, including the Internet.

Latency of communication between the endpoint terminal 102 and the ground network 108 is determined at least in part by the distance between the endpoint terminal 102 and the satellite 104, and the distance between the satellite 104 and the gateway terminal 106. For previous satellite communication systems that used satellites in geosynchronous or geostationary Earth orbit (GEO), the large distances involved created high amounts of latency. Therefore, it is desirable to use constellations of satellites in non-GEO orbit, for example, low Earth orbit (LEO), for communication systems.

Embodiments of the present disclosure are directed to configurations for endpoint terminals 102 (or user terminals) to optimize network communications to and from the satellite. In particular, the exemplary embodiments disclosed herein relate to systems and methods for orienting endpoint terminals 102 based on latitude position or other relevant data, including proximity to population centers or natural features, of the Earth-based end point terminal.

For the purposes of global satellite coverage applications, for example, for global internet coverage, a large number of satellites are needed defining a predictable grid of satellite coverage. If there are not enough satellites in a predictable grid, frequent service outages may occur. The design of the constellation of satellites to meet the needs of the communication application is a function of desired satellite altitude and inclination pairing, antenna characteristics, and the design of the satellite ground tracks, all described in greater detail below.

An Earth-based endpoint terminal 102 may be a terminal connected to Earth or as a non-orbiting body positioned in the Earth's atmosphere, such as a non-mobile atmospheric platform. For example, an Earth-based endpoint terminal 102 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a stationary object, such as a balloon.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

Satellite Constellations

The satellite constellations of the present disclosure are in non-geostationary orbits. A satellite in a geostationary orbit is at an altitude of approximately 35,786 km above mean sea level. Satellite constellations of the present disclosure are at lower altitudes. In one embodiment of the present disclosure, the satellite constellation of the present disclosure is at an altitude of less than 10,000 km. In another embodiment, the satellite constellation of the present disclosure is in a low Earth orbit at an altitude of less than 2000 km. In another embodiment, the satellite constellation of the present disclosure is in a very low Earth orbit at an altitude of less than 500 km.

User or endpoint terminals 102 of the present systems 100 are designed and configured in accordance with embodiments of the present disclosure to work in conjunction with LEO satellite constellations. Because LEO satellite constellations, unlike GEO satellite constellations, do not remain stationary relative to a specific location on Earth, such changes are accommodated in the design of the satellite constellation and the user terminals 102. The drifting nature of LEO satellite constellations is described in greater detail below.

Unsynchronized (Drifting) Orbital Planes

Figure 2A:
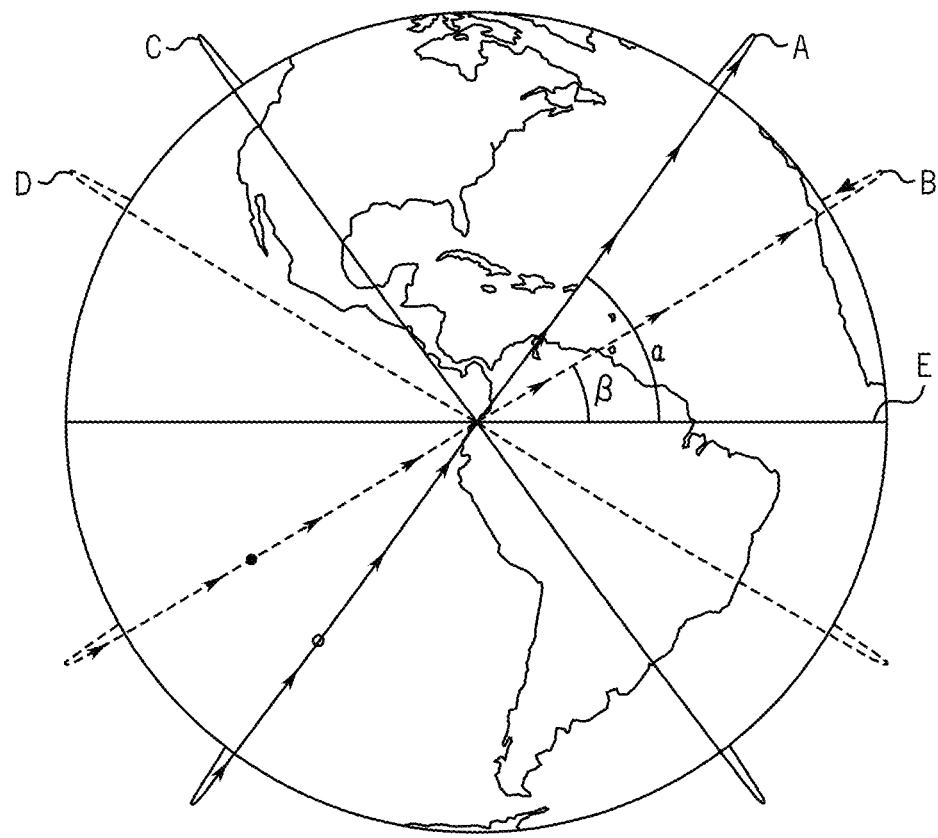
FIGS. 2A and 2B are schematic diagrams illustrating first and second satellite systems having different inclinations and similar altitudes resulting in drifting orbital planes in accordance with previously developed satellite constellation technology.

Referring to FIG. 2A, a constellation of satellites is provided. The constellation shows four satellite orbits in four different orbital planes, including satellites strings A, B, C, and D. For simplification in the illustrated embodiment, the satellite strings include one satellite. However, in accordance with embodiments of the present disclosure, each satellite string includes a plurality of satellites following each other in the path of the orbital plane.

Satellite strings A, B, C, D are at similar altitudes, but at different inclinations, inclinations angle A and inclination angle B. For example, string A is at an inclination α of about 55 degrees relative to the equator E and string B is at an inclination β of about 32 degrees relative to the equator E. Satellite strings C and D mirror satellite strings A and B.

The altitudes of the satellite strings are not exactly the same to avoid collision of satellites in different systems, but they are within close range of each other, such that altitude is a minimal factor in the different operating characteristics of the first and second satellite strings A and B. For example, satellite string A and satellite string B may be in an altitude range of a few kilometers, less than 200 km.

Figure 2B:
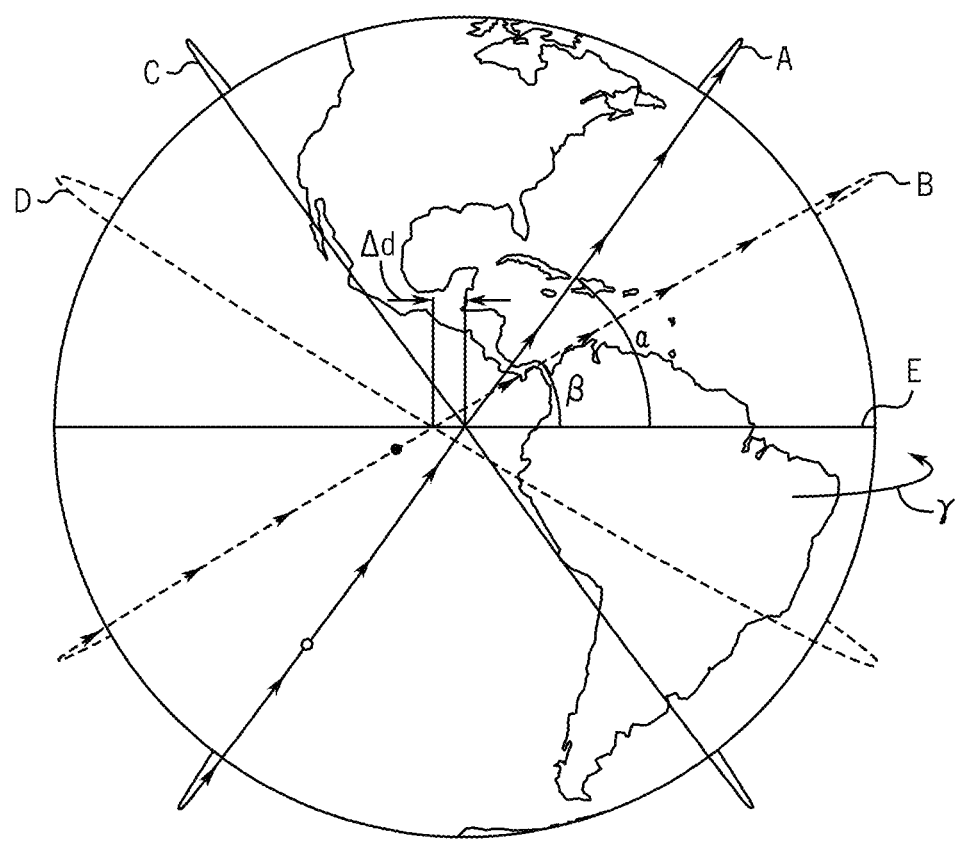

Referring to FIG. 2B, the two satellite strings A and B of FIGURE IA have different westward drift rates in view of their different inclinations A and B. Therefore, after a period of time, as the Earth rotates in the eastward direction as indicated by arrow r, both satellite strings A and B have drifted westward. However, the second string of satellites B has drifted more westward than the first string of satellites A, as shown by drift differential Δd.

The drift differential Δd between the first and second satellite strings A and B can be undesirable because it adds uncertainty to the meshing between the two areas of coverage by the two satellite strings A and B. Meshing or interleaving between satellite strings can be desirable in communication systems that depend on a known satellite constellation for predictable satellite coverage.

Synchronized (Fixed Drift) Orbital Planes

Figure 3:
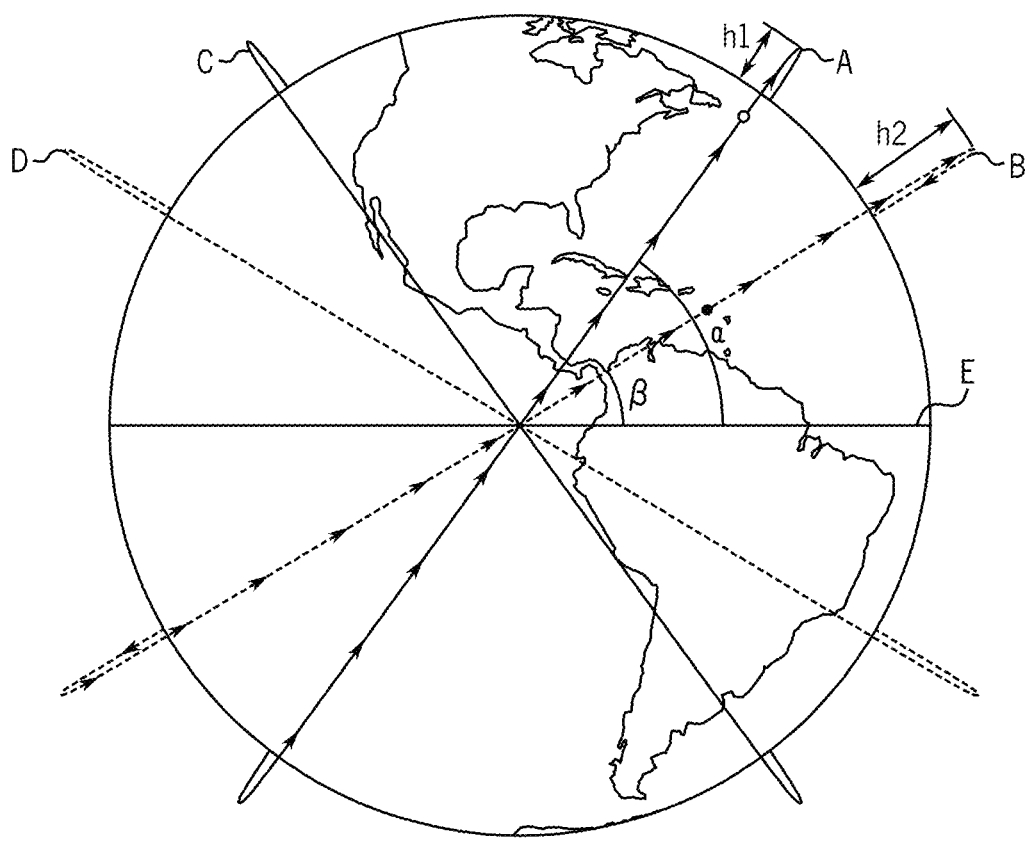
FIG. 3 is a schematic diagram illustrating first and second satellite systems having different inclinations and different altitudes resulting in non-drifting orbital planes in accordance with previously developed satellite constellation technology.

Referring to FIG. 3, one solution for reducing the difference in drift rate between two satellite systems in accordance with previously developed technology is to fly the two satellite systems at two different altitudes. See altitude h1 for satellite string A and altitude h2 for satellite string B. The altitude difference between the two satellite systems A and B can be fixed such that the precession of the right ascension of the ascending node (RAAN) is identical for the satellites in either satellite orbital plane.

Figure 4:
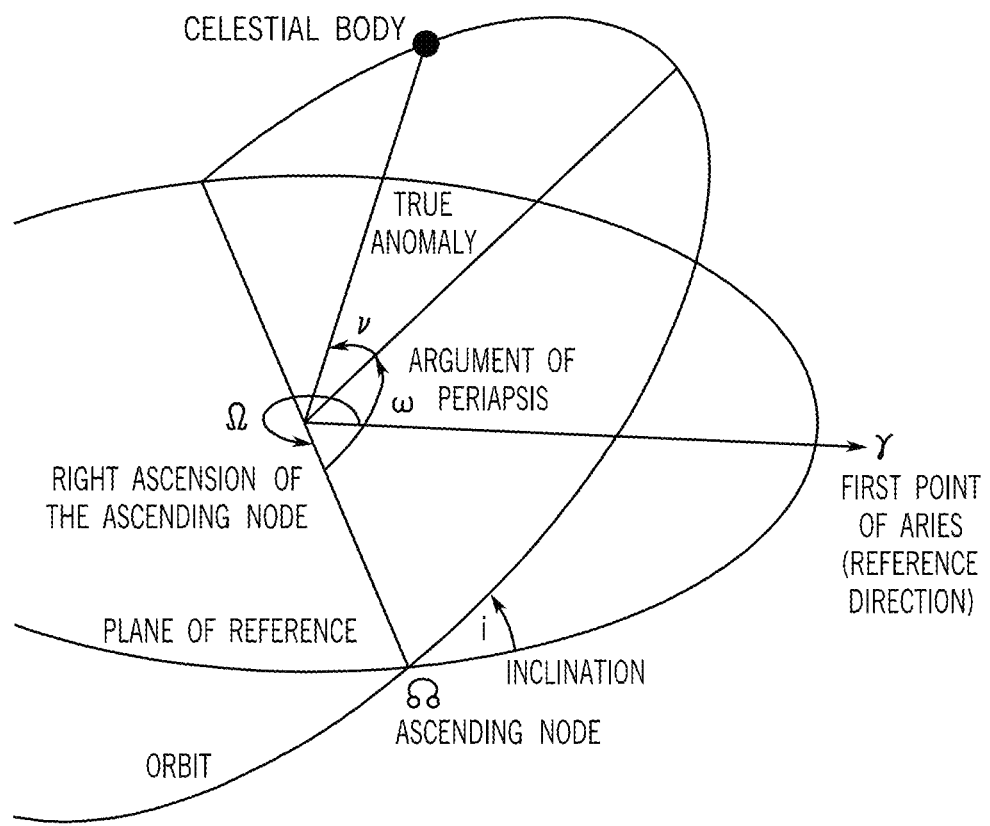
FIG. 4 is a schematic diagram illustrating the ascending node of an orbiting body in accordance with embodiments of the present disclosure.

Referring to FIG. 4, for a geocentric orbit of an object orbiting Earth, Earth's equatorial plane (E) is the reference plane and the First Point of Aries γ (which is considered to be the celestial "Prime Meridian") is the origin of longitude. In an inertial frame with the Earth rotating, the longitude of the orbit is wherein the orbit crosses the plane of reference measured from the reference direction γ, measured eastwards (or, as seen from the north, counterclockwise) from the First Point of Aries γ to the ascending node Ω, and is called the right ascension of the ascending node (RAAN). Two numbers orient the orbital plane in space: inclination and RAAN.

The longitude of the ascending node (LAN) is measured relative to the Prime Meridian (Greenwich Line), in the geographic coordinate system at which longitude is defined to be 0° dividing the Earth into the Eastern Hemisphere and the Western Hemisphere (in contrast to RAAN, which is measured relative to a celestial plane of reference).

Returning for FIG. 3, string A may, for example, be at an inclination α of about 55 degrees relative to the equator E and an altitude of approximately 1150 km and string B may be at an inclination β of about 32 degrees relative to the equator E and an altitude of approximately 2040 km. Because the precession of the RAAN for the two satellite systems is identical, the systems drift together in a locked drift such that they continue to mesh and be interleaved.

RAAN precession can be calculated using the following equation:

$$\dot{\Omega} = -\frac{3}{2} J_2 \left(\frac{\text{Radius}_{Earth}}{p_A}\right)^2 n_A$$

-continued $$n = \sqrt{\frac{\mu}{a^3}}$$

$$\cos i_A = -\frac{3}{2} J_2 \left( \frac{\text{Radius}_{Earth}}{p_B} \right)^2 n_B \cos i_B$$

$$p = a(1 - e^2)$$

Wherein $\dot{\Omega}$ is RAAN precession, J2 is Earth's oblateness, 〚Radius〛 _Earth is the Earth's mean equatorial radius, i is the orbit inclination, a is the orbit semi-major axis, e is the orbit eccentricity, and μ is the Earth's gravitational parameter.

While a locked drift is desirable for satellite coverage, it may be difficult to acquire government licenses needed to operate two orbital satellite strings in two different altitudes required for a locked drift. In addition, satellites configured to fly at altitudes that are within close altitude range (for example, within an altitude range of less than about 200 km) can be designed with similar (if not the same) design characteristics. Satellites flying at vastly different altitudes present design challenges due to differences in flying conditions.

Therefore, user terminals can be designed to accommodate satellite string drift in the case of all satellites flying at the same inclination, or satellite drift differential in the case of satellites flying at different inclinations, or both.

Figure 5:
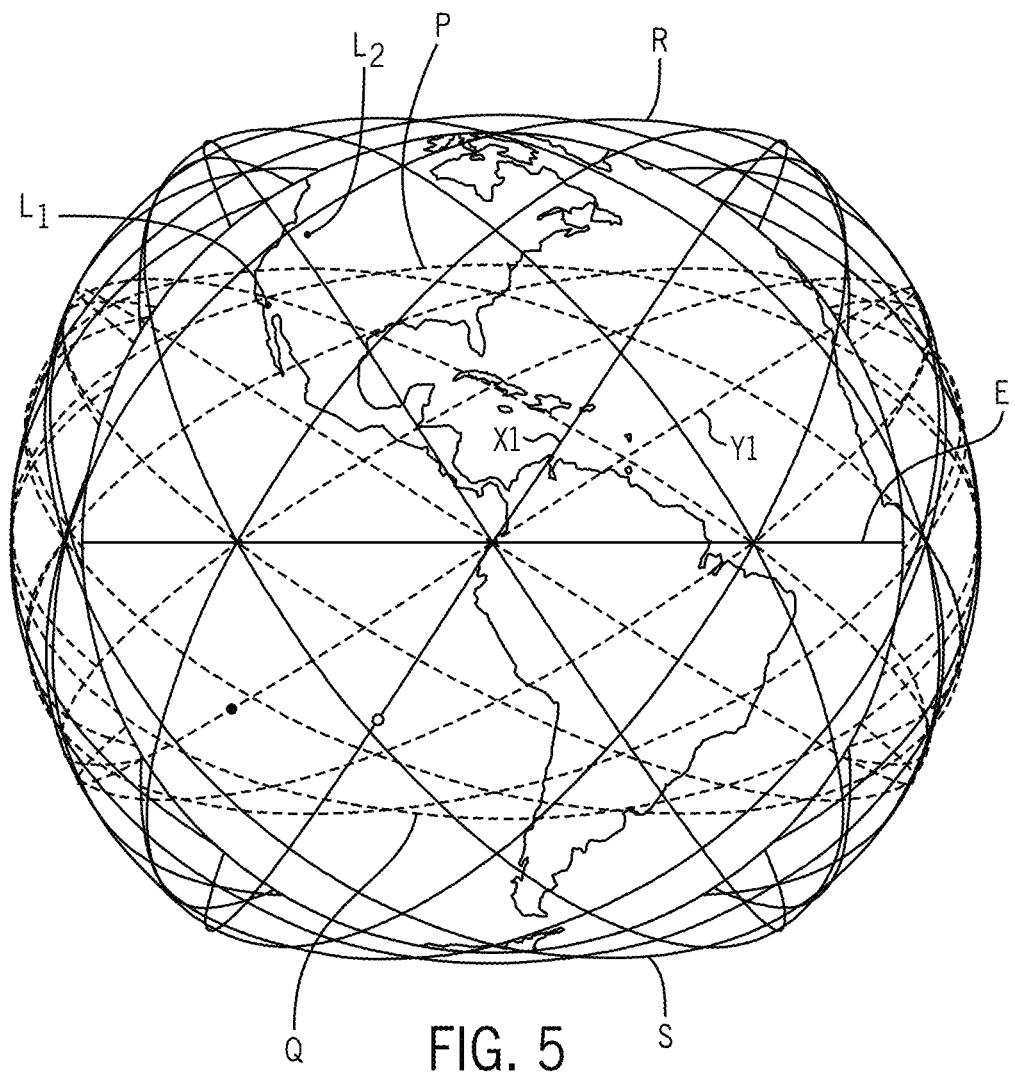
FIG. 5 is a schematic showing satellite planar orbital patterns on a rotating Earth for two different satellites as two different inclinations (without accounting for drift differential) in accordance with embodiments of the present disclosure.

Referring to FIG. 5, in a frame that rotates with the Earth, satellites in the first and second satellite strings X1 and Y1 are in discrete orbits, each defining an orbital path and each satellite string X1 and Y1 having a different inclination, similar to the satellite constellation. The satellite system may be designed with the required number of loops to be repeating ground track systems or may have a drifting pattern relative to the Earth's rotation rate.

Meshing or interleaving between satellite strings is desirable in communication systems that depend on a known satellite constellation for predictable satellite coverage, as illustrated below in EXAMPLES 1-3.

Example 1

One Inclination, One Ground Track

Figure 6A:
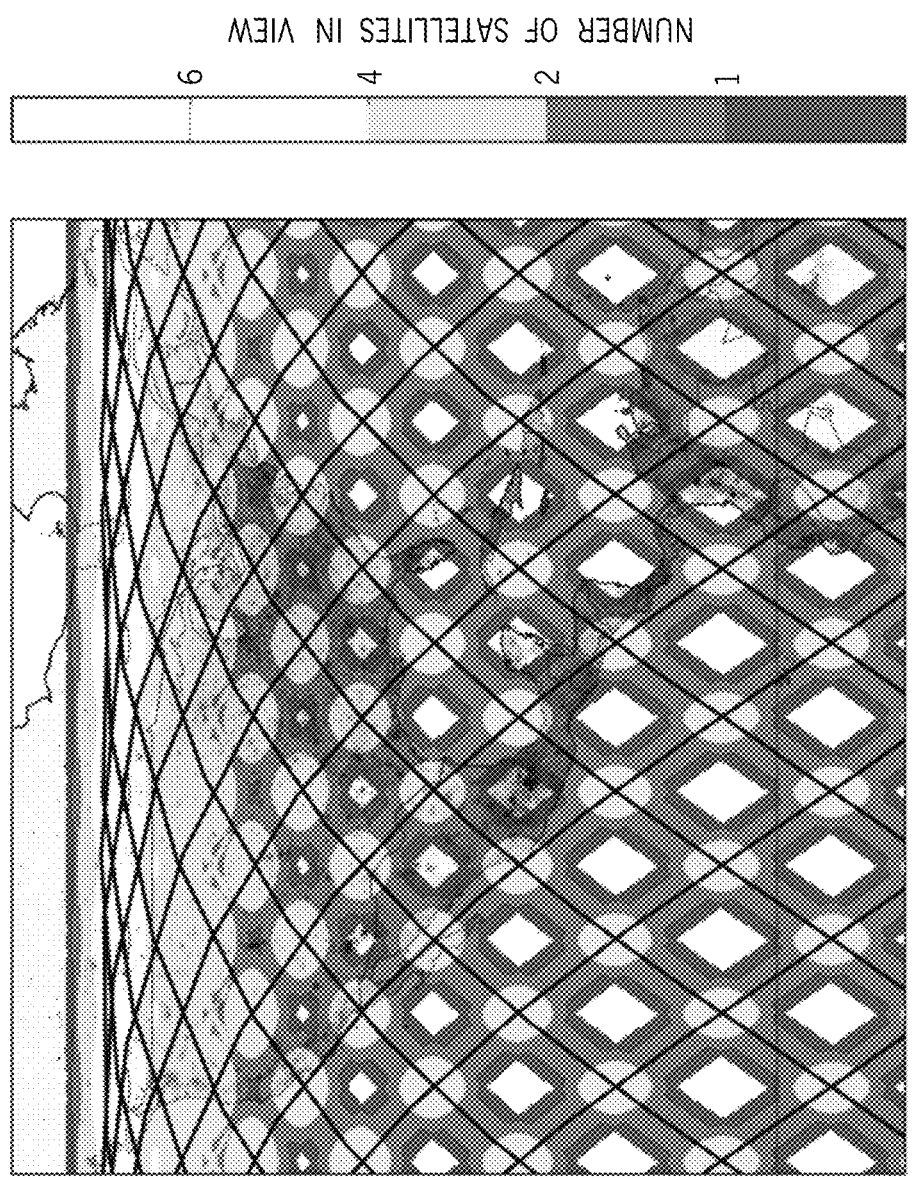
FIGS. 6A, 6B, and 6C are schematic diagrams illustrating examples of ground coverage for various satellite constellations in accordance with embodiments of the present disclosure.

Referring to FIG. 6A, an exemplary contour plot of satellite communication coverage is provided. The contour plot shows the mean number of satellites in view. The ground track includes 31 satellite revolutions every 2 days. The number of satellites is 2549 at altitude 345.6 km. The inclination of the satellite string is at 53.0. The spacecraft antenna nadir angle is 40.5 degrees, and the user terminal minimum elevation angle is 46.8 degrees.

The lines of the contour plot show the ground track of the satellites. The ground tracks may be repeating or non-repeating (i.e., moving slowly across the surface of the Earth, either East or West). The contour plot shows communication coverage increases where the ground tracks cross. The contour plot shows no communication coverage at a certain distance from the ground tracks.

Example 2

Two Inclinations, Two Ground Tracks

Figure 6B:
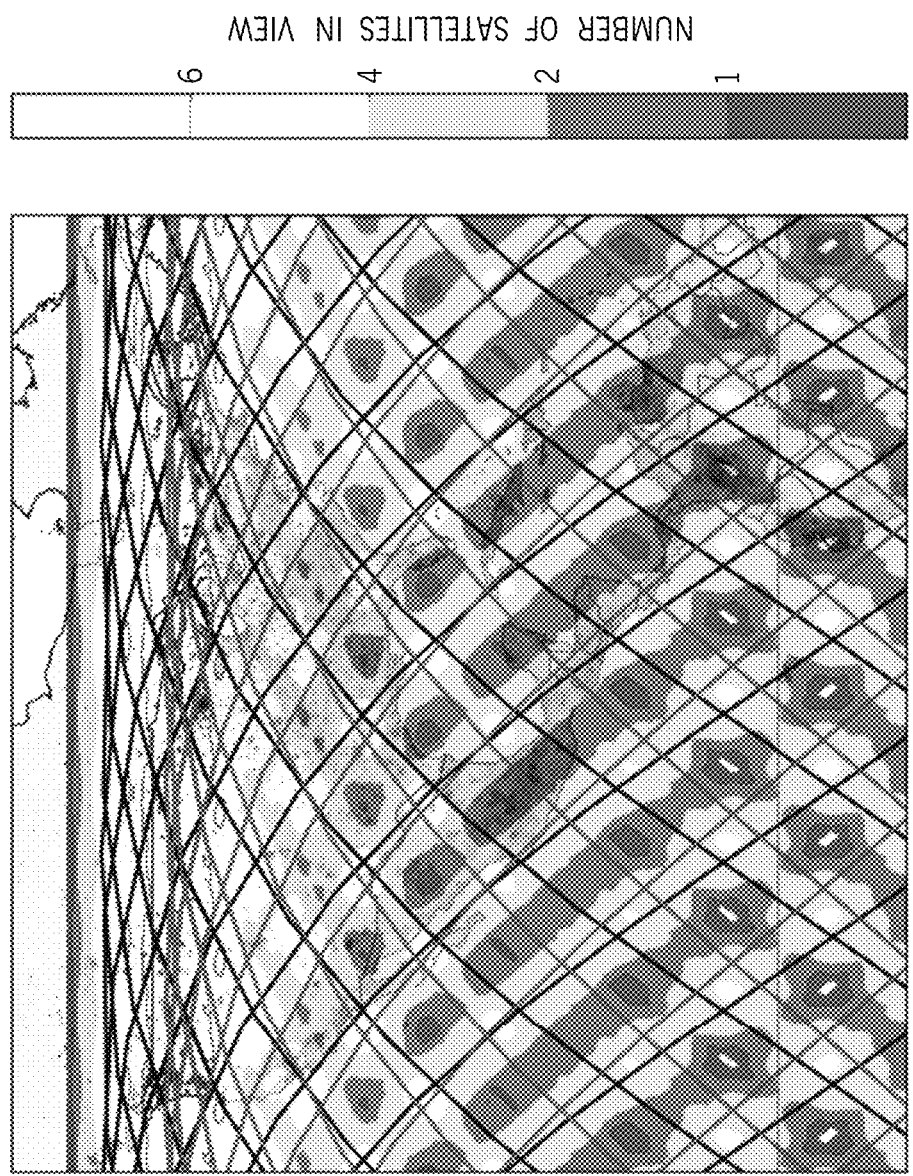

Referring to FIG. 6B, an exemplary contour plot of satellite communication coverage is provided. The contour plot shows the mean number of satellites in view. The first and second ground tracks each include 31 satellite revolutions every 2 days. The number of satellites in the two ground tracks is 5026 at altitudes 345.6 and 340.8. The inclinations of the satellite strings are at 53.0 and 48.0. The spacecraft antenna nadir angle is 40.5 degrees, and the user terminal minimum elevation angle is 46.8 degrees.

The lines of the contour plot show the first and second ground tracks of the satellites. The ground tracks may be repeating or non-repeating (i.e., moving slowly across the surface of the Earth, either East or West). The contour plot shows communication coverage increases compared to the communication coverage in EXAMPLE 1 as a result of the addition of the second ground track at a second inclination.

Example 3

Three Inclinations, Three Ground Tracks

Figure 6C:
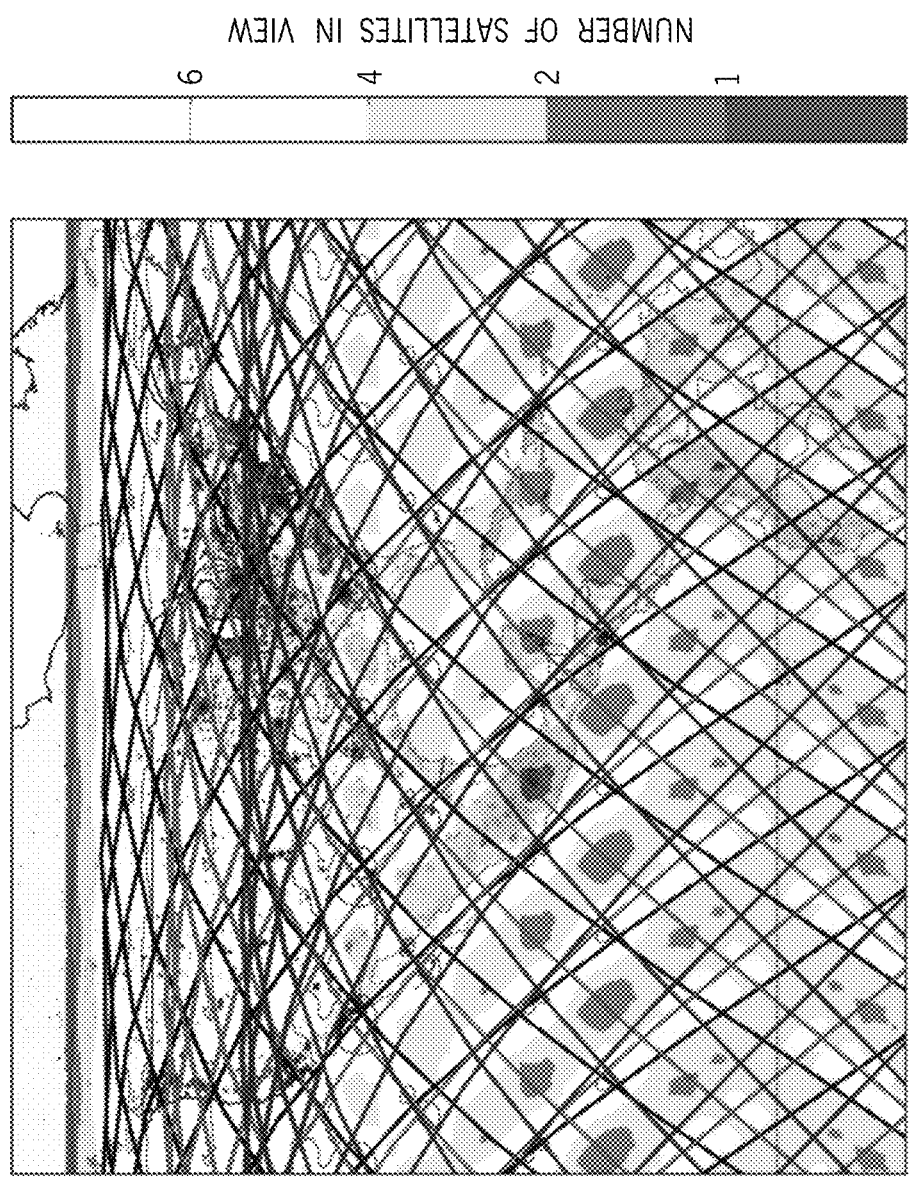

Referring to FIG. 6C, an exemplary contour plot of satellite communication coverage is provided. The contour plot shows the mean number of satellites in view. The first, second, and third ground tracks each include 31 satellite revolutions every 2 days. The number of satellites in the three ground tracks is 7518 at altitudes 345.6, 340.8, and 335.9 kms. The inclinations of the satellite strings are at 53.0, 48.0, and 42.0 degrees. The spacecraft antenna nadir angle is 40.5 degrees, and the user terminal minimum elevation angle is 46.8 degrees.

The lines of the contour plot show the first, second, and third ground tracks of the satellites. The ground tracks may be repeating or non-repeating (i.e., moving slowly across the surface of the Earth, either East or West). The contour plot shows significantly increased communication coverage increases compared to the communication coverage in EXAMPLES 1 and 2 as a result of the addition of the third ground track at a third inclination.

As seen in the three-dimensional satellite travel paths of FIG. 5 and the contour plots of FIGS. 6A, 6B, and 6C, the orbital track of satellites traveling at a certain inclination angle and the geometry of the Earth create a higher density of satellites near the northern-most and southern-most planes of latitude as compared to near the equator.

Assuming each satellite string X1 or Y1 in FIG. 5 has a known number of equally spaced or substantially equally spaced satellites traveling in a planar orbit circling the Earth, the orbital pattern of a satellite constellation at a specific inclination angle (compare the orbital patterns of X1 and Y1 at different inclination angles) and the geometry of the Earth create a swarm of satellites at or near the upper and lower limiting latitudes of the orbital path.

For a prograde orbit, the upper and lower limiting latitudes of the orbital path (indicated as P and Q for satellite string X1 in FIG. 5 or R and S for satellite string Y1 in FIG. 5) typically correspond to the angle of inclination of the satellite. For example, a satellite string X1 having an angle of inclination of 42 degrees has upper and lower limiting latitudes P and Q of 42 degrees north of the equator and 42 degrees south of the equator. For a retrograde orbit, the upper and lower limiting latitudes of the orbital path correspond to 180 degrees minus the inclination angle. For example, a satellite having an angle of inclination of 138 degrees also has and upper and lower limiting latitude of 42 degrees Likewise, a satellite string Y1 having an angle of inclination of 53 degrees has upper and lower limiting latitudes R and S of 53 degrees north of the equator and 53 degrees south of the equator.

User Terminal Having a Steerable Beam and a Limited Field of Regard

In accordance with one embodiment of the present disclosure, a user terminal is configured for communication with a LEO satellite constellation consisting of satellites which emit or receive radio frequency (RF signals).

An antenna (e.g., a dipole antenna, parabolic antenna, or patch antenna) typically generates or receives radiation in a pattern that has a preferred direction, known as the main beam. Signal quality (e.g., signal to noise ratio or SNR), whether in transmitting or receiving scenarios, can be improved by aligning, or steering, the main beam of the antenna with a direction of the target or source of signal. In electronically steered antenna systems, a plurality of individual antenna elements are employed together to reorient, or steer, the main beam relative to those physically fixed antenna elements. In mechanically steered antenna systems, a single or multiple antenna elements are physically moved to reorient the main beam.

Because LEO satellite constellations, unlike GEO satellite constellations, do not remain stationary relative to a specific location on Earth, the user terminal of the present embodiment is configured with an antenna system having an antenna aperture with at least one degree of freedom to orient this preferred direction of transmitting or receiving electromagnetic radiation. This steering may be accomplished either electronic or mechanical means, or a combination thereof.

In accordance with the embodiments of the present disclosure, the user terminal is incapable of steering its main beam to address the entire hemisphere of the sky as defined by the local horizon of the location of the user terminal on the Earth. This steering limitation is the result of mechanical, regulatory, or electrical limitations of the beam steering technology used in the user terminal. The area in which this antenna is capable of steering to for communication is referred to as the field of regard, or interchangeably the communication zone. An antenna which is incapable of steering its beam to address any arbitrary location within its local hemisphere of sky is referred hereafter as a limited field of regard antenna.

User Terminal Having a Phased Array Antenna

In accordance with one illustrative embodiment of the present disclosure, a user terminal may be configured with a phased array antenna that electronically steers in one or two directions. The phased array antenna includes array antenna aperture defined by a lattice of a plurality of antenna elements distributed in, for example, M columns oriented in the first direction and N rows extending in a second direction at an angle relative to the first direction (such as a 90 degree angle in a rectangular lattice or a 60 degree angle in a triangular lattice) configured to transmit and/or receive signals in a preferred direction.

An antenna (e.g., a dipole antenna) typically generates radiation in a pattern that has a preferred direction. For example, the generated radiation pattern is stronger in some directions and weaker in other directions. Likewise, when receiving electromagnetic signals, the antenna has the same preferred direction. Signal quality (e.g., signal to noise ratio or SNR), whether in transmitting or receiving scenarios, can be improved by aligning the preferred direction of the antenna with a direction of the target or source of signal. However, it is often impractical to physically reorient the antenna with respect to the target or source of signal. Additionally, the exact location of the source/target may not be known. To overcome some of the above shortcomings of the antenna, a phased array antenna can be formed from a set of antenna elements to simulate a large directional antenna. An advantage of the phased array antenna is its ability to transmit and/or receive signals in a preferred direction (i.e., the antenna's beamforming ability) without physically repositioning or reorienting the system.

In accordance with one embodiment of the present disclosure a phased array antenna system is configured for communication with a satellite that emits or receives radio frequency (RF) signals. The antenna system includes a phased array antenna including a plurality of antenna elements distributed in a plurality of M columns oriented in the first direction and a plurality of N rows extending in a second direction normal to the first direction, and a plurality of phase shifters aligned for phase offsets between antenna elements in the first and second directions.

Figure 7:
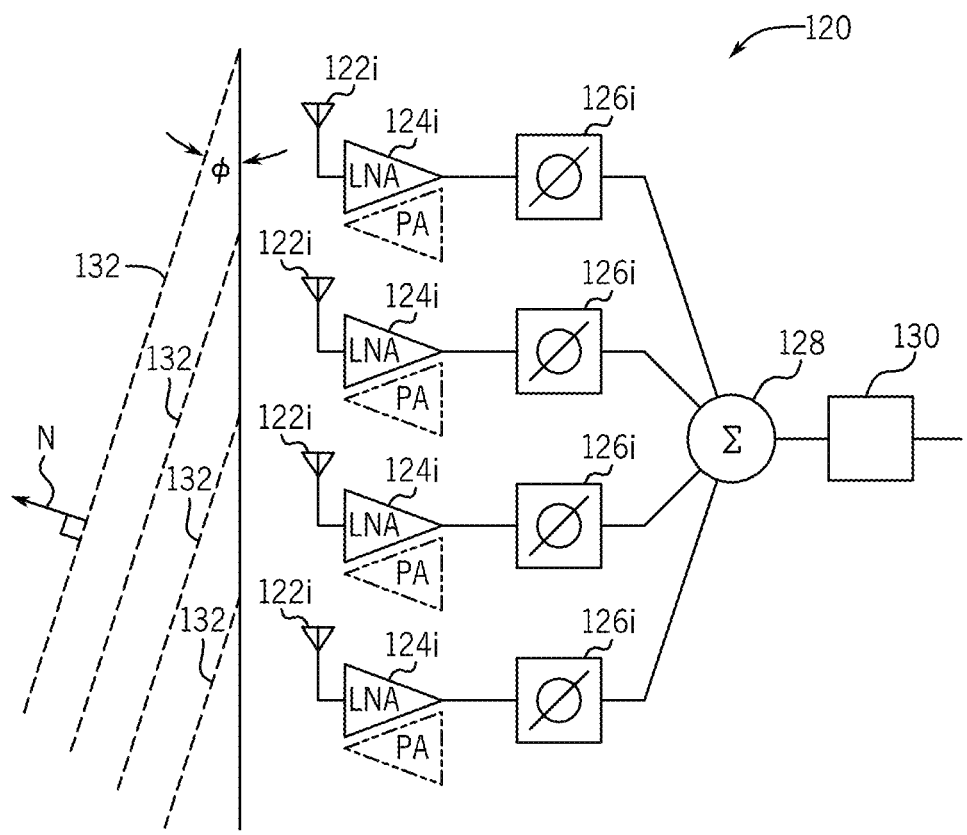
FIG. 7 is a schematic diagram illustrating an exemplary a phased array antenna in accordance with embodiments of the present disclosure.

FIG. 7 is a schematic illustration of a phased array antenna system 120 in accordance with some embodiments of the present disclosure. The illustrated system includes multiple antenna elements 122$i$ configured for transmitting a signal moving from right to left on the schematic. The outgoing radio frequency (RF) signals are routed from a modulator 130 via a distributer 128 to individual phase shifters 126$i$. The RF signal is phase-offset by the phase shifters 126$i$ by different phases, which vary by a predetermined amount from one phase shifter to another. The PAs 124$i$ in transmit mode (or LNAs in receive mode) amplify the phase-offset RF signals, and antenna elements 122$i$ emit the RF signals as electromagnetic waves. (As seen in FIG. 8, described below, an exemplary phased array antenna radiation pattern is shown.)

At a receiving phased array antenna (moving from left to right in FIG. 7), the wave fronts 132 can be detected by a set of individual antenna elements 122$i$ and amplified by a set of LNAs 124$i$. The wave fronts 132 may reach the antenna elements 122$i$ at different times. Therefore, the received signal will generally include phase offsets from one antenna element of the receiving (RX) antenna to another. Analogous to the emitting phased array antenna case, these phase offsets can be adjusted-for by another set of phase shifters 126$i$ connected to the respective antenna elements 122$i$. For example, each phase shifter 126$i$ (e.g., a phase shifter chip) can be programmed to adjust the phase of the signal to the same reference, such that the phase offset among the individual antenna elements is canceled in order to combine the RF signals corresponding to the same wave front 132. As a result of this constructive combining of signals, a higher signal to noise ratio (SNR) can be attained on the received signal, which results in increased channel capacity.

Figure 8:
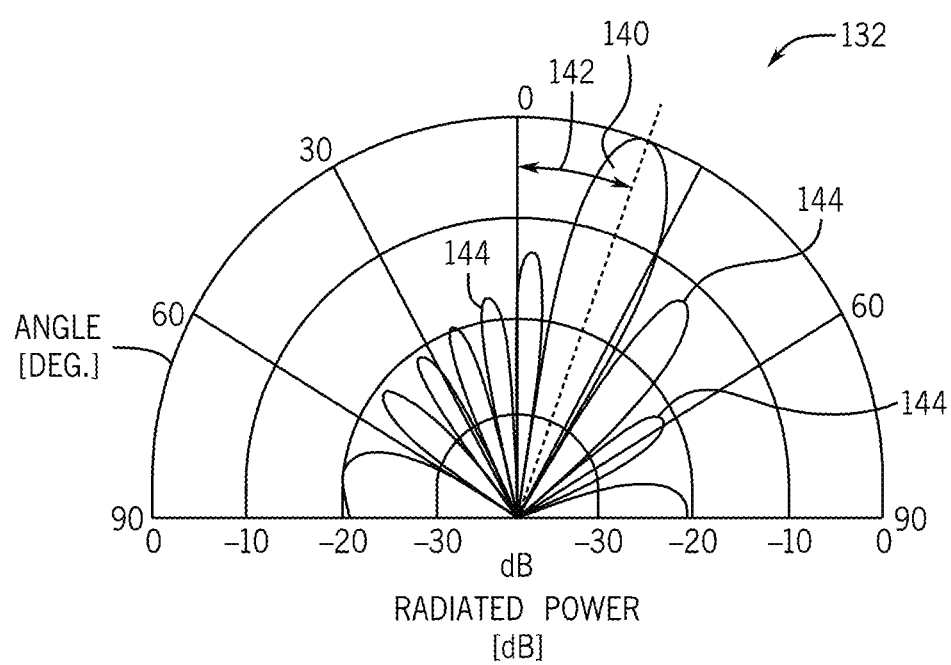
FIG. 8 is a graph of a main lobe and undesirable side lobes of an exemplary antenna signal from a phased array antenna.

FIG. 8 is a graph of main and side lobes of an antenna signal in accordance with embodiments of the present disclosure. The horizontal axis shows radiated power in dB. The radial axis shows angle of the RF field in degrees. The main lobe or main beam 140 represents the strongest RF field that is generated in a preferred direction by a phased array antenna. In the illustrated case, a desired directivity 142 of the main lobe 140 corresponds to about 20°. Typically, the main lobe 140 is accompanied by a number of side lobes 144 that are generally undesirable because the side lobes 144 derive their power from the same power budget, thus reducing the available power for the main lobe 140. Furthermore, in some instances the side lobes 144 may reduce SNR at the receiving antenna.

Figure 9:
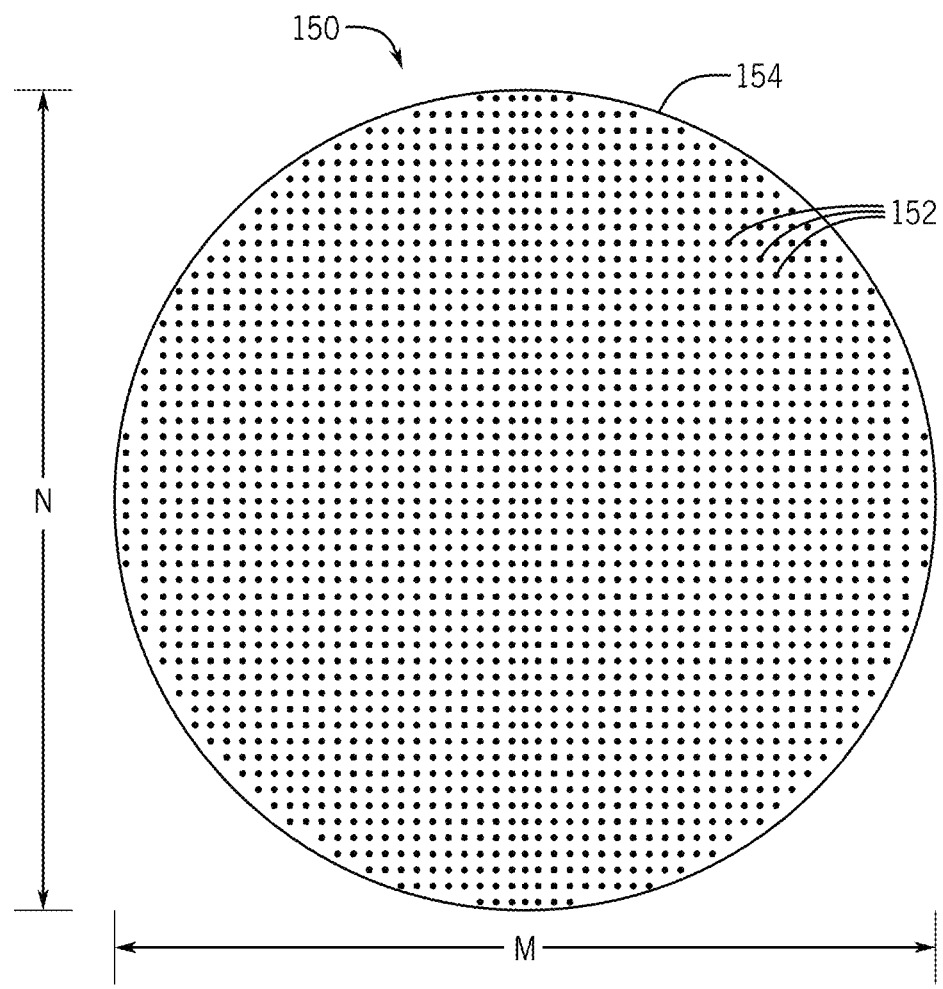
FIG. 9 is an exemplary schematic diagram illustrating a layout of plurality of individual antenna elements of a phased array antenna in accordance with embodiments of the present disclosure.

FIG. 9 shows a schematic layout or lattice 150 of individual antenna elements 152i of a phased array antenna. The illustrated phased array antenna lattice 150 included antenna elements 152i that are arranged in a 2D array of M columns by N rows. For example, the phased array antenna lattice 150 has a generally circular or polygonal arrangement of the antenna elements 152i. In other embodiments, the phased array antenna may have another arrangement of antenna elements, for example, a square arrangement or other polygonal arrangement of the antenna elements. As described above, the antenna elements 152i are arranged in multiple rows and columns can be phase offset such that the phased array antenna emits a waveform in a preferred direction. When the phase offsets to individual antenna elements are properly applied, the combined wave front has a desired directivity of the main lobe.

Figure 14:
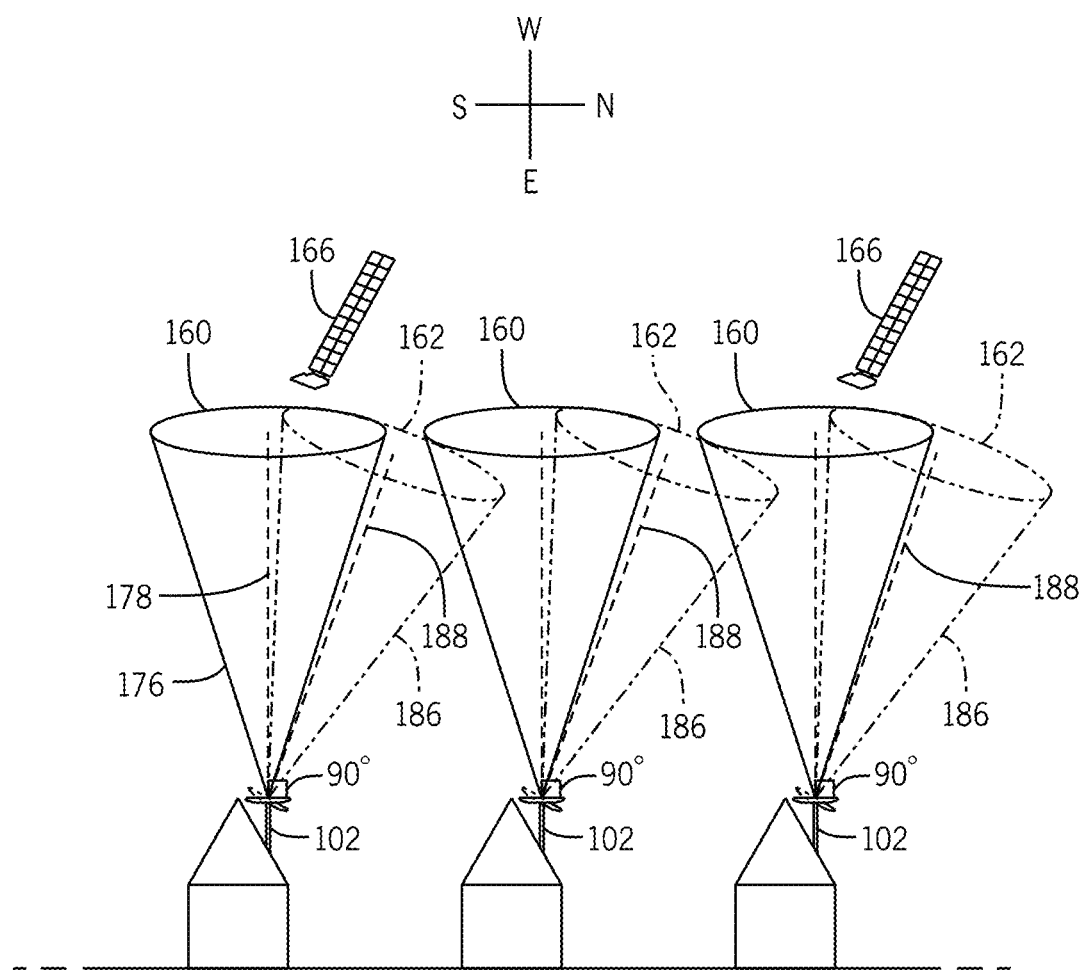
FIG. 14 is a not-to-scale exemplary schematic diagram illustrating a plurality of adjacent user or end point terminals having communication zones.

Referring to the exemplary embodiment in FIG. 14, a phased array antenna aperture 154 can generate a generally conically shaped communication zone 176 having a boresight vector (illustrated as the central longitudinal axis 178 of the conically shaped communication zone 176) and field of regard 160. The field of regard 160 is a function of the angle the phased array antenna can steer from its boresight vector 178. In the case of an electrically steering phased array antenna, the field of regard is a limited field of regard which is less than the total sky view of a particular use at a specific location. The phased array antenna may be configured to be oriented in a specific orientation depending on the geographic location of the user terminal. In that regard, in addition to tilting, the user terminal or the phased array antenna may be panned to appropriately position the phased array antenna according to the user terminal's geographic location.

Field of Regard for a Phased Array Antenna

Figure 10:
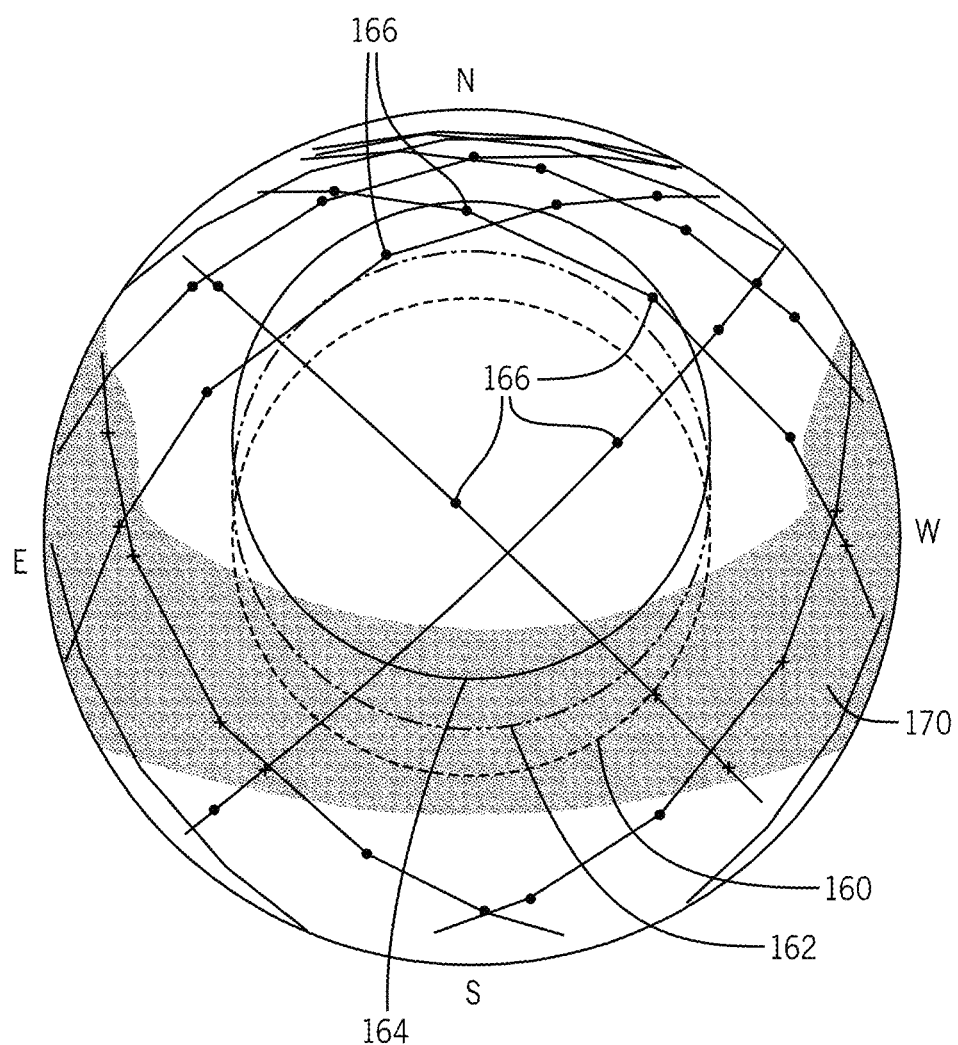
FIGS. 10 and 11 are exemplary schematic diagrams of the sky view of a user or end point terminal showing satellites in the constellation in view and the GEO-belt.
Figure 11:
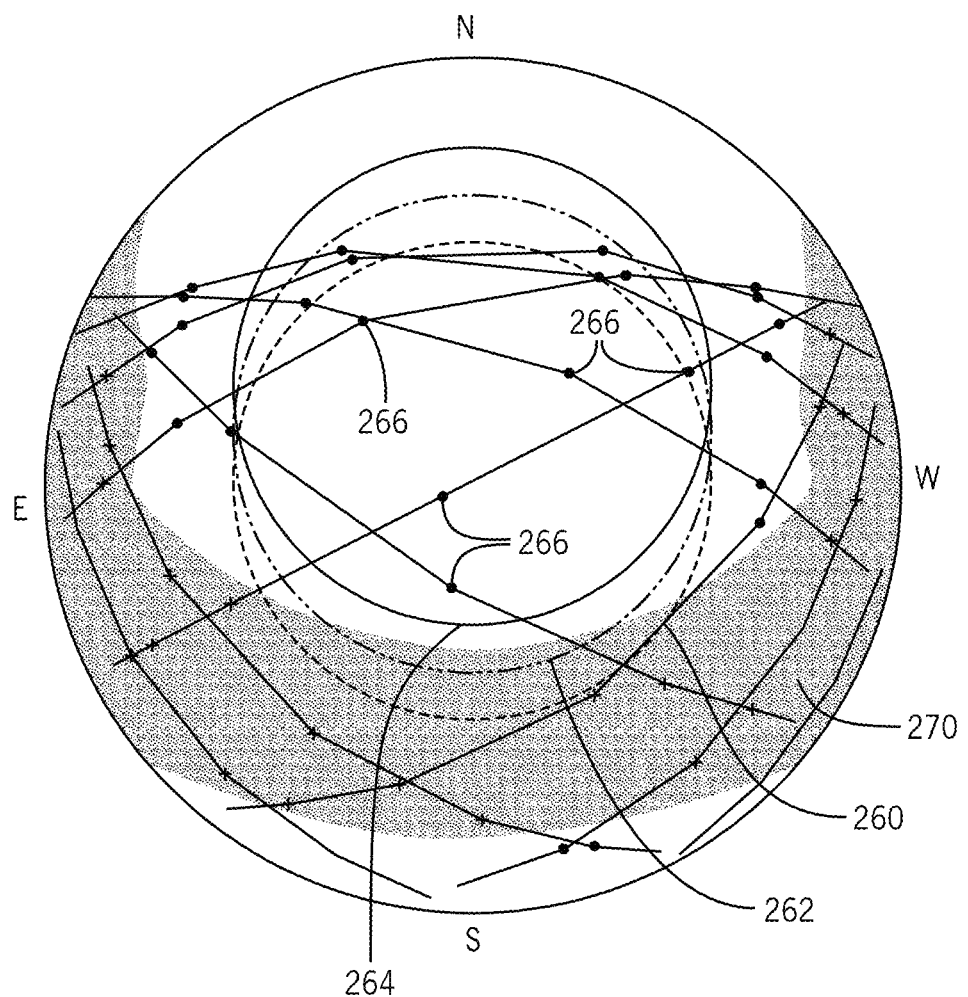

Referring to FIG. 10, an upward sky view is provided for exemplary user terminal in Los Angeles, California, United States, illustrating a field of regard 160 for an exemplary two-dimensional phased array antenna. Because the user terminal is looking upward at the sky, East and West direction indicators are transposed. Referring to FIG. 11, in another location using the same two-dimensional phased array antenna, an upward sky view is provided for a user terminal in Seattle, Washington, United States, illustrating a similar field of regard 260.

In the illustrated fields of regard 160 and 260 of FIGS. 10 and 11, upward sky views of visible satellites 166 (FIG. 10) and 266 (FIG. 11) in the satellite constellation (for example, one of the exemplary constellations of FIG. 5 or 6A, 6B, or 6C) are shown. The visible satellites 166 and 266 in the respective fields of regard 160 (FIG. 10) and 260 (FIG. 11) are available for communication.

The exemplary fields of regard 160 and 260 in the respective illustrated embodiments of FIGS. 10 and 11 are designed to be generally circular in configuration, inscribing the largest angle to which the antenna system is capable of (or configured to) steer as measured from the boresight vector of the antenna system. However, depending on the design and configuration of the phased array antenna and the antenna aperture in the user terminal, the field of regard may have other shapes (for example, a square shape, a polygonal shape, or another suitable shape).

Design of the User Terminal

Figure 13A:
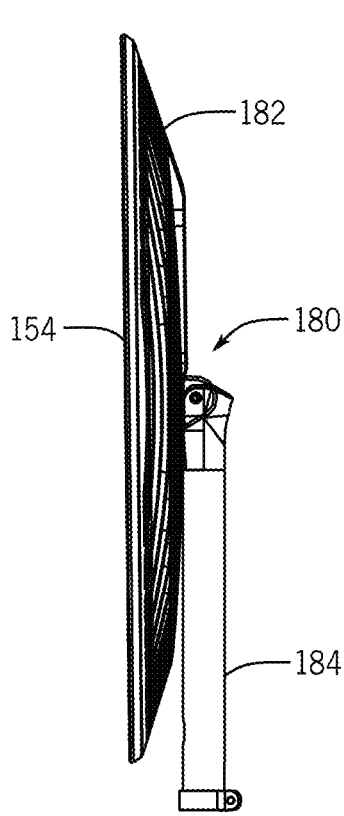
FIGS. 13A, 13B, 13C are side views of an exemplary user or end point terminal in various different orientations.
Figure 13B:
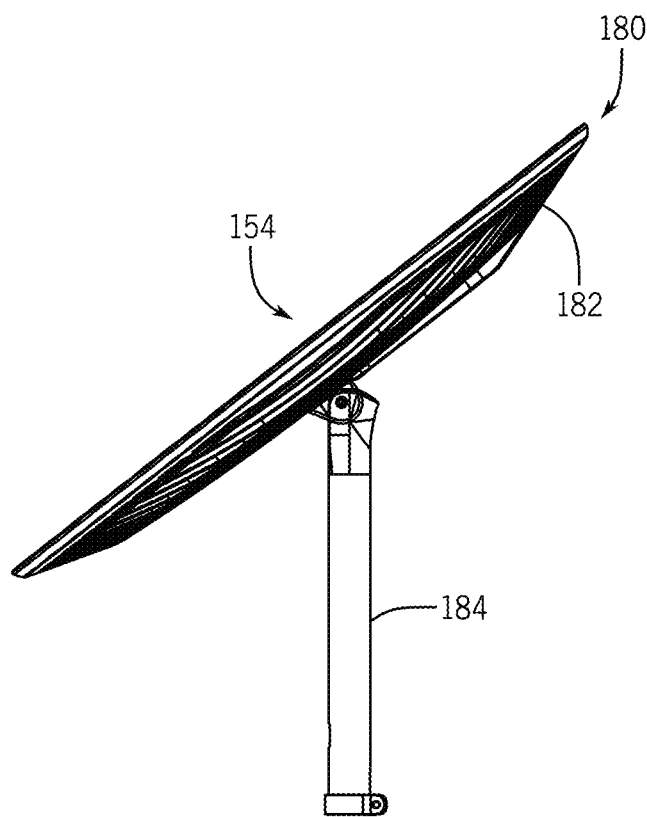
Figure 13C:
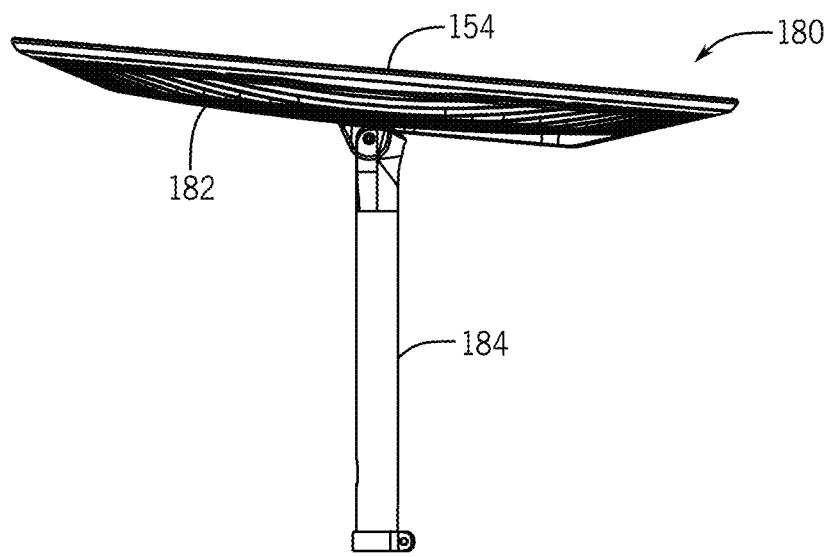

Referring now to FIGS. 13A, 13B, and 13C, an exemplary user terminal 180 is designed and configured to allow for tilt-ability of the housing 182 for a phased array antenna aperture 154 (see FIG. 9) relative to its mount, such as by a mounting leg 184. Such tilt-ability of the phased array antenna aperture 154 allows for not only rain and snow removal and heat dissipation, but also for orientation of the field of regard 160a with the sky for enhanced radio frequency communication with one or more satellites depending on the geolocation of the phased array antenna aperture 154 and the orbit of the satellite constellation.

FIGS. 13A, 13B, and 13C shows limits of tilt-ability of an exemplary phased array antenna system having an exemplary mounting system of the illustrated embodiment, with FIG. 13A showing an antenna aperture 154 tilted to full vertical tilt relative to a mounting leg 184, FIG. 13C showing the antenna aperture 154 tilted to near horizontal relative to the mounting leg 184, and with FIG. 13B showing a middle tilt position. However, other tilting positions and tilting configurations are within the scope of the present disclosure. The user terminal 180 of FIGS. 13A-13C is merely an exemplary illustration of a user terminal 180 having a tilt-able antenna aperture 154. For example, in other non-limiting embodiments, the user terminal may have other tilt-ability mechanisms or the housing may remain fixed and the antenna aperture may be tilt-able.

Geobelt

Still referring to FIGS. 10 and 11, the shaded areas 170 and 270 in the sky views illustrate the GEO-belt of satellites in geosynchronous equatorial orbit (GEO). See also FIG. 12 for an illustration of the GEO-belt of satellites 172. A GEO orbit is a circular orbit 35,786 km (22,236 mi) above Earth's equator and following the direction of Earth's rotation. An object in GEO orbit has an orbital period equal to the Earth's rotational period. Therefore, to ground observers, the satellite appears motionless at a fixed position in the sky.

Many satellites co-exist in the GEO-belt. For example, communications satellites are often placed in a GEO orbit so that Earth based satellite antennas can be pointed permanently at the position in the sky where the satellites are located and do not need to be rotated for tracking. Further, weather satellites in GEO orbit for real time monitoring and data collection, and navigation satellites in GEO orbit to provide a known calibration point to enhance GPS accuracy.

Within the GEO-belt, weather or earth observation satellites might not interfere with GEO-belt communication satellites. However, broadcast or communication satellites are typically spaced to avoid frequency interference or overlap. In addition to proper spacing between satellites within the GEO-belt, communication satellites in other orbits, such as LEO and MEO orbits, can be designed and configured to avoid interference with already existing GEO communication satellites.

Figure 12:
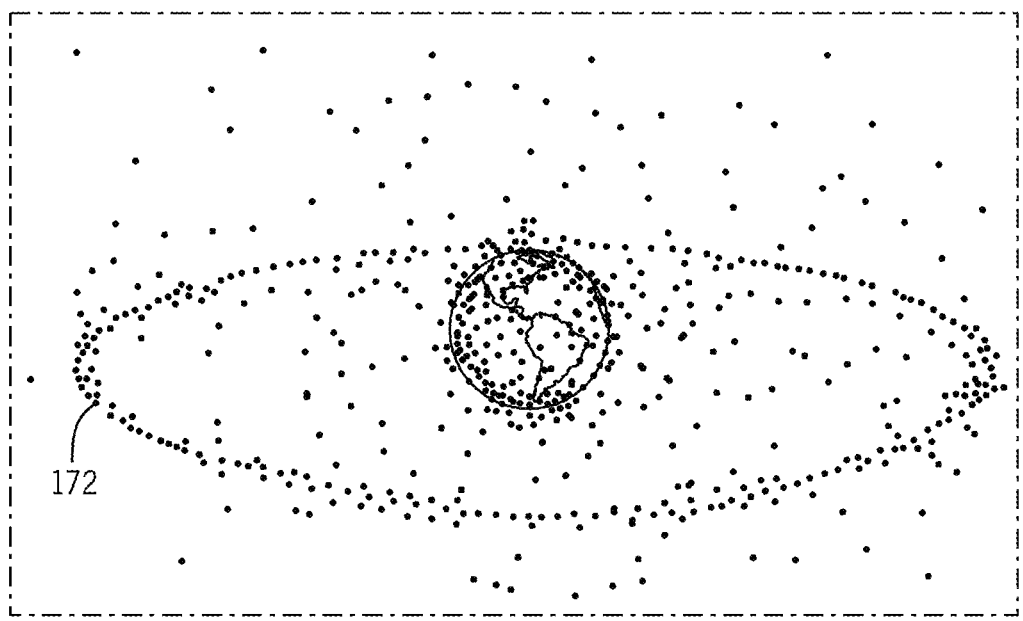
FIG. 12 is a not-to-scale exemplary schematic diagram illustrating the GEO-belt of geostationary satellites orbiting the equator with an orbital period of exactly one day (flying at an altitude of approximately 35,786 km above mean sea level).

Referring to FIG. 12, a not-to-scale simplified illustration of Earth and its satellites is provided, which shows the line formed by the GEO-belt 172 of satellites. Returning to FIGS. 10 and 11, the respective shaded areas 170 and 270 show what the potential interference zone for the GEO-belt 172 of satellites in geosynchronous equatorial orbit (GEO)

look like in the fields of regard (e.g., 160 in FIGS. 10 and 260 in FIG. 11) of a user terminal having a phased array antenna.

Depending on the latitude of the user terminal, the view of the GEO belt interference zone 170 or 270 with respect to the field of regard 160 or 260 may change. For example, FIG. 10 illustrates a sky view for a user terminal in Los Angeles, California, at a latitude of 34.0522° N (see L1 in FIG. 5). In contrast, FIG. 11 illustrates a sky view for a user terminal in Seattle, Washington, at a latitude of 47.6062° N (see L2 in FIG. 5).

Although, the GEO-belt 172 seen in FIG. 12 is generally comprised of a band of satellites located in space at a certain altitude above Earth's equator and following the direction of Earth's rotation, the GEO-belt interference zone 170 or 270 is a larger range of communication interference based on the performance of an antenna system to avoid interference with the GEO belt. For example, in accordance with embodiments of the present application, the GEO-belt interference zone may be in a range of +/−5 to 30 degrees of the GEO-belt.

In the illustrated embodiment of the present application, the GEO-belt interference zone 170 or 270 is defined as +/−18 degrees of the GEO-belt 172. Therefore, the shaded areas 170 and 270 representing the GEO-belt interference zones 170 and 270 in respective FIGS. 10 and 11 are sized to represent the communication interference zone of +/−18 degrees of the GEO-belt 172.

As seen in the illustrated examples of FIGS. 10 and 11, the GEO-belt interference zone 170 or 270 is more centered in the sky view of user terminals positioned closer to the equator. Because Los Angeles L1 is closer to the equator E than Seattle L2 (see FIG. 5), the GEO-belt interference zone 170 has a greater degree of overlap with the field of regard 160 for an antenna system having a substantially vertical central vector (see central boresight vector 178 in FIG. 14 for field of regard 160) in Los Angeles in FIG. 10 than in the field of regard 260 for an antenna system having a substantially vertical central vector in Seattle in FIG. 11. Therefore, a greater tilt angle for the user terminal is generally used if the user terminal is positioned closer to the equator within the upper and lower limits of the satellite string orbital path (see FIG. 5) to reduce the amount of overlap between the field of regard and the GEO-belt interference zone.

Figure 15:
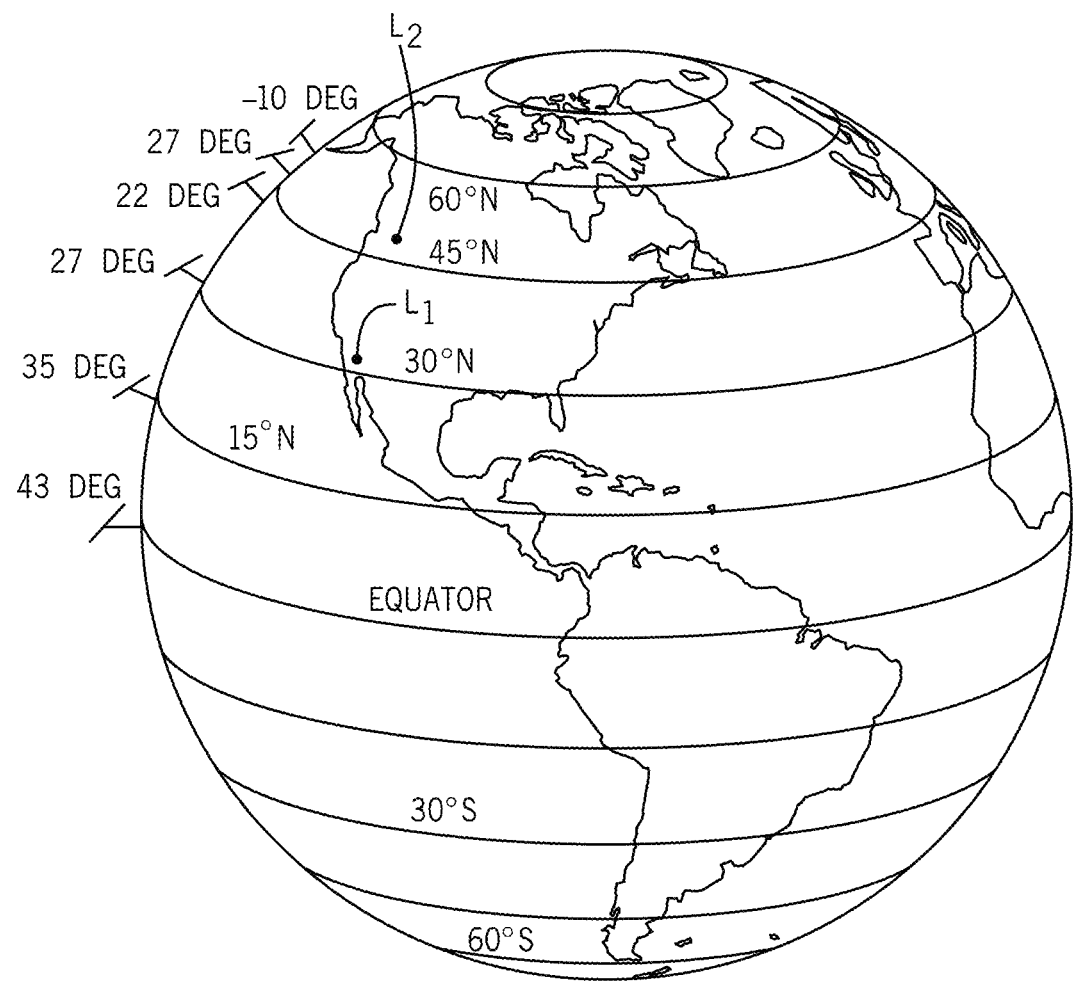
FIG. 15 is a not-to-scale schematic illustrating exemplary tilt angles at various latitude lines for a satellite constellation having a particular angle of inclination in accordance with embodiments of the present disclosure.

As a non-limiting example, FIG. 15 shows the user terminal as being tilted in a range of −10 to 43 degrees in the northern hemisphere, depending on the latitudinal positioning of the user terminal and the angle of inclination of the orbital path of the satellite string (for example, 42 degrees as seen for orbital path X1 in FIG. 5). For example, the user terminal may be tilted 22 degrees in Seattle and 27 degrees in Los Angeles, and more than 30 degrees in south Florida.

Tilting Depending on Latitude

Returning to FIGS. 10 and 11, the tilt of the antenna system 154 of the user terminal can be selected based on the latitude of the user terminal, for example, see L1 for Los Angeles and L2 for Seattle in FIG. 5. Referring to FIG. 10, the field of regard can be adjusted from a non-tilted field of regard 160 to a first exemplary tilted field of regard 162 at a first northward tilt angle away from the Earth's equator or a second exemplary tilted field of regard 164 at a second northward tilt angle away from the Earth's equator. Compare also in FIG. 14, a non-tilted field of regard 160 with a tilted field of regard 162.

In accordance with embodiments of the present disclosure, an antenna system is an antenna having an antenna aperture with a defined limited field of regard. In some embodiments described herein, an antenna system (such as a phased array antenna aperture) may be capable of electronic steering to steer its beam in a selected non-vertical direction. Such beam steering (as illustrated in FIG. 8 showing a steered main beam 140) is to be distinguished from physical tilting of the antenna aperture and the field of regard it generates (as illustrated in FIG. 14).

In accordance with embodiments of the present disclosure, a non-tilted antenna is an antenna having a limited field of regard which has a central vector (or boresight vector) located in a substantially vertical orientation. The central vector is defined as the vector between the antenna aperture location and the geometric centroid of the antenna system's field of regard projected onto the hemisphere of the sky defined by the local horizon surrounding the antenna aperture location. A substantially vertical orientation is designed to be substantially perpendicular to a tangent plane to the Earth's mean surface (not accounting for geological features such as mountainous inclines or valley declines, which depending on altitude may further affect prescribed tilt angle).

In a non-limiting example of a planar phased array, a non-tilted flat phased array antenna system may include an antenna aperture surface oriented substantially parallel to a tangent plane to the Earth's mean surface (not accounting for geological features such as mountainous inclines or valley declines, which depending on altitude may further affect prescribed tilt angle). However, in other non-planar antenna systems, such as conformal phased array systems, a non-tilted antenna may not be oriented in a substantially horizontal orientation but still may have a substantially vertically oriented boresight vector.

Other exemplary tilted fields of regard may also be determined depending on the mesh of the satellite constellation in the field of regard 160, 162, and/or 164 of the user terminal. In the illustrated embodiment, the first and second tilted fields of regard 162 and 164 show reduced overlap with the GEO-belt interference zone 170 and an increased number of satellites visible within that field of regard, with the second tilted field of regard 164 having no overlap with the GEO-belt interference zone 170 and an increased number of satellites visible within that field of regard.

Likewise, referring to FIG. 11, the field of regard can be adjusted from a first non-tilted field of regard 260 to a first exemplary tilted field of regard 262 at a first northward tilt angle away from the Earth's equator or a second exemplary tilted field of regard 264 at a second northward tilt angle way from the Earth's equator. The first and second tilted fields of regard 262 and 264 show reduced overlap with the GEO-belt interference zone 270 and an increased number of satellites visible within that field of regard, with the second tilted field of regard 264 having less overlap than the first tilted field of regard 262 and an increased number of satellites visible within that field of regard.

In the illustrated embodiments of FIGS. 10 and 11 for tilting of the field of regard, the tilting for the illustrated latitudes may be in the northward direction away from the Earth's equator. For other locations, such as equivalent latitudes to FIGS. 10 and 11 in the southern hemisphere, the tilting of the field of regard may be southward away from the Earth's equator.

For still other locations in the northern hemisphere, the tilting may be in the southward direction to optimize for the same parameters. Likewise, there may be locations in the southern hemisphere where tilting in the northward direction may be preferable to optimize for the same parameters. For example, as described above, the upper and lower limiting latitudes of the orbital path typically correspond to the angle of inclination of the satellite. For example, as seen in FIG. 5, the orbital path of a satellite string X1 having an angle of inclination of 42 degrees has upper and lower limiting latitudes P and Q of 42 degrees north of the equator and 42 degrees south of the equator. Likewise, the orbital path of a satellite string Y2 having an angle of inclination of 53 degrees has upper and lower limiting latitudes of 53 degrees north of the equator and 53 degrees south of the equator. Above or below the upper and lower limiting latitudes of a satellite orbital path, the tilting may be in the opposite direction to tilt toward the swarm of satellites at or near the upper and lower limiting latitudes of the orbital path. See, for example, FIG. 15.

Accordingly, a method of orienting a user or endpoint terminal at an Earth-based location includes determining a latitude location of the Earth-based location for a limited field of regard antenna for communication with a non-GEO satellite constellation.

Based on a first latitude location of the user or endpoint terminal, the user or automated system may select a first tilt angle to adjust the field of regard from a non-tilted field or regard to a first tilted field of regard for a first tilted antenna aperture.

Based on a second latitude location of the user or endpoint terminal, the user or automated system may select a second tilt angle to adjust the field of regard from non-tilted field of regard to a second tilted field of regard for a second tilted antenna aperture, and so on.

After the tilt angle is selected, the user or an automated system may tilt the user or endpoint terminal to the appropriate tilt angle. Such tilt reduces the interference of the field of regard with the GEO-belt interference zone and increases the number of satellites visible within that field of regard (as seen in FIGS. 5 and 6A-6C).

Referring to FIGS. 14 and 15, a method of orienting a user terminal at an Earth-based location may also include an assessment of neighboring tilted fields of regard and the landscape surrounding the user terminal 102, such as trees, buildings, and other obstructions that might affect the communication between a given user terminal and the constellation of satellites 166 with which it is communicating. In the illustrated embodiments of FIGS. 14 and 15, the northward direction is toward the right of the page.

Referring to FIG. 14, a series of adjacently located homes in the Earth's northern hemisphere, each having a user terminal 102 are illustrated. The antenna systems of the user terminals 102 have fields of regard 176 which are shaped in a conical fashion resulting from the maximum angle that the user terminal may steer from the boresight vector 178 to the conical field of regard 176. In addition, the antenna systems of the user terminals 102 are oriented to have a boresight vector substantially vertical (or substantially perpendicular to a tangent to the Earth's mean surface).

Shown in phantom in FIG. 14, the user terminals 102 can be tilted northward to generate tilted fields of regard each generating a tilted cone-shaped communication zone 186 having a tilted boresight vector and a tilted field of regard 162.

As can be seen in FIG. 14, the tilted fields of regard 162 of at least a subset of user terminals in a given geographical area (or cell) on Earth will communicate with the same satellite for reliability of communication if the users tilt their antenna systems at the same or similar tilt angles. For example, if every user terminal in a geographical cell, such as a 30 km diameter cell, points their antenna system in the same direction at the same tilt angle, the fields of regard of their antenna systems will overlap at a LEO distance, for example, a distance of 500 km from the Earth.

If the users tilt their antenna system in arbitrary different directions, this may not result in enough overlap between communication zones to serve all users in a subset or geographical region using the same satellite, and communication reliability will decrease for a given geographical area on Earth.

In some cases, there may be multiple satellites available for communication with a certain geographical cell. In this case, a first subset of user terminals within the geographical cell may tilt at a first tilt angle to communicate with a first satellite, and a second subset of user terminals within the geographical cell may tilt at a second tilt angle to communicate with a second satellite, and so on. There may be additional prescribed tilt angles within the geographical cell depending on the satellite availability within the satellite constellation.

Of note, for tilted communication, the distance the communications signals must travel is longer as compared to direct overhead communication. Even though the travel distance for communication between tilted user terminals and satellites is increased, the advantageous effects tilting away from the GEO-belt and tilting toward the swarm of satellites near the upper and lower limiting latitudes of the satellite string orbital path may provide enhanced communication performance.

Referring to FIG. 15, a method of orienting a user or endpoint terminal at an Earth-based location further includes determining the upper and lower limiting latitudes of an orbital path for a satellite string as defined by the angle of inclination of the satellite string. For example, for an orbital path Y1 in FIG. 5 having an angle of inclination of 53 degrees, a user terminal may be properly orientated to have no tilt at the upper limiting latitude for the orbital path at 53 degrees latitude or at corresponding lower limiting latitude for the orbital path −53 degrees latitude.

In accordance with embodiments of the present disclosure, FIG. 15 illustrates a series of user terminals located at various latitudes and showing adjusted north and south tilt angles based on latitude and the upper limiting latitude of the orbital path for the satellite string. At the equator, the tilt angle is the greatest at 43 degrees northward. As the user terminals are positioned more northward on the Earth's surface, the tilting angle remains in the northward direction by progressively decreases to 35 degree at 15°N, to 27 degrees at 32°N, to 22 degrees at 42°N, then back to 27 degrees at 48 N. At 53°N, the user terminal is tilted 10 degrees southward to tilt toward the swarm of satellites at the upper limiting latitude of the orbital path for the satellite string.

Tilting Depending on Geographical Features

Figure 16:
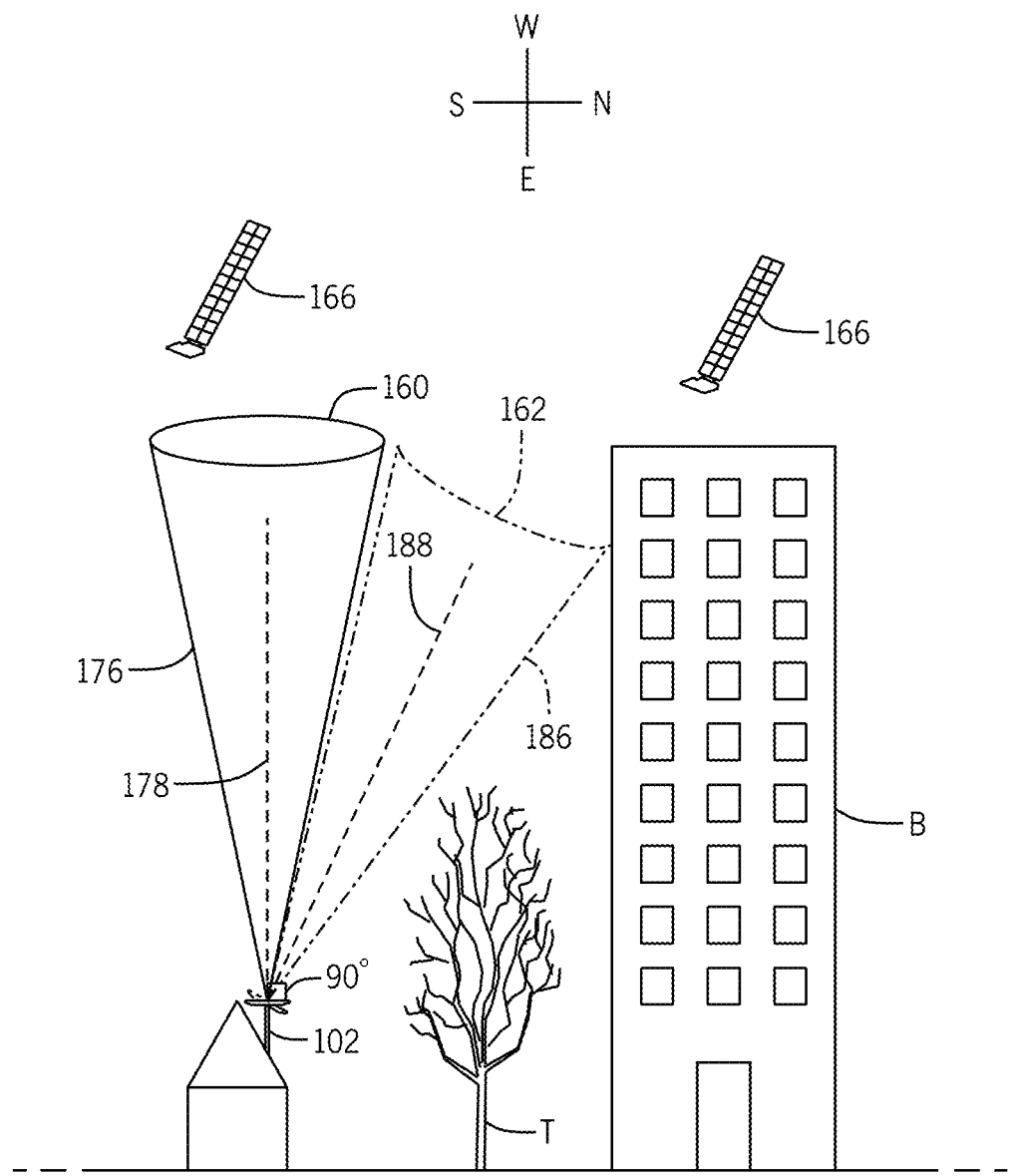
FIG. 16 is a not-to-scale exemplary schematic diagram illustrating a user or end point terminal having a communication zone adjacent obstructing features.

Referring to FIG. 16, other obstructions may prevent effective tilting of the field of regard 162 for a user terminal 102. For example, a tilted field of regard 162 may not be obstructed by an adjacent tree T, but may be obstructed by an adjacent building B. Therefore, a method of configuring a user terminal 102 may include assessing interfering obstructions close to the tilted communication zone 186 of the user terminal, and determining if a user terminal can, in fact, be located in a specific location, or if a new location needs to be determined for that user terminal. Such obstructions may be determined by land owner surveys or by GNSS and geospatial data. If multiple prescribed tilt angles are available within the cell, the choice for a user terminal of whether to use a first tilt angle or a second tilt angle may depend on an obstruction analysis.

In addition to north or south tilting for tilting away from the geo belt and tilting to increase the number of visible satellites within the field of regard, the user terminal may also be tilted in north or south and east or west directions for load balancing of satellites in the satellite constellation based on user terminal population density or geographical features. For example, if a certain geographic area does not include a dense set of user terminals, an adjacent geographic area may be able to take advantage of the satellite coverage available in the first geographic area.

As a non-limiting example, if a geographic cell of user terminals is located eastward of a large body of water, such as the Pacific Ocean, some or all of the user terminals in the geographic cell may be tilted westward to take advantage of a second nearby satellite that is further in distance from the user terminal than a first satellite, but the second nearby satellite having reduced communication load. Likewise, a cell of user terminals located westward of the Atlantic Ocean may be tilted eastward to take advantage of a second nearby satellite that is further in distance from the user terminal than a first satellite, but the second nearby satellite having reduced communication load.

Figure 17:
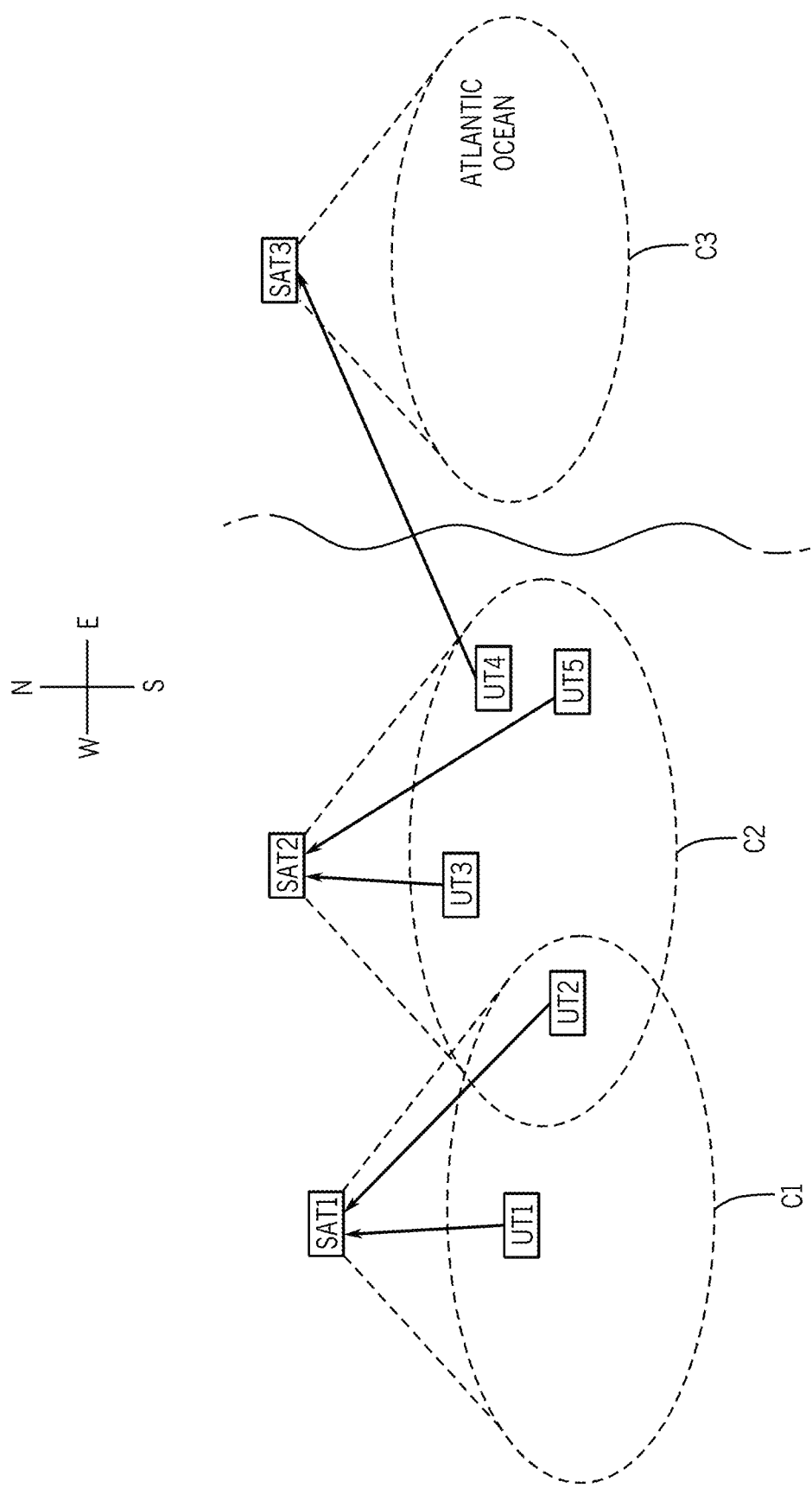
FIG. 17 is a not-to-scale exemplary schematic illustrating satellite communication coverage cells.

Referring to FIG. 17, three satellites SAT1, SAT2, and SAT3 are shown, each defining a geographic coverage cell C1, C2, or C3 for communication coverage. Within each cell are a plurality of user terminals UT1-UT5. In the illustrated embodiment, UT1 and UT2 are configured for communication with SAT1, both being within SAT1's coverage cell C1. However, UT2 is also within SAT2's coverage cell C2 and can be electronically steered to communicate with either satellite SAT1 or SAT2. In SAT2's coverage cell are three other user terminals UT3, UT4, and UT5. For load balancing, UT4 and/or UT5 may be tilted eastward to communicate with SAT3, which is currently located over the Atlantic Ocean and has no user terminals within its coverage cell C3.

As discussed above, for tilted communication, the distance the communications signals must travel is longer as compared to direct overhead communication. Even though the travel distance for communication between UT4 or UT5 and SAT3 as compared to the travel distance for communication to SAT2 is increased, the advantageous effects of load balancing may provide enhanced communication performance.

In another non-limiting example, geographic area may not be a body of water, but may be sparsely inhabited, or may be a country that does not subscribe to the service provided by the satellite constellation.

The tilting configuration for a cell of user terminals or a portion of the cell of user terminal may include a combination of north or south and east or west tilting. In addition the factors discussed above, other factors that may affect tilt angle of a user terminal include the latitude location for the endpoint terminal, a longitude location of the endpoint terminal, obstructions, geological features, population density, an altitude of the end point terminal, a load balancing analysis of the satellite constellation, one or more angles of inclination of the satellite constellation, a geographical cell to which the end point terminal belongs, and combinations thereof.

Methods for Determining Tilt Angles

Figure 18:
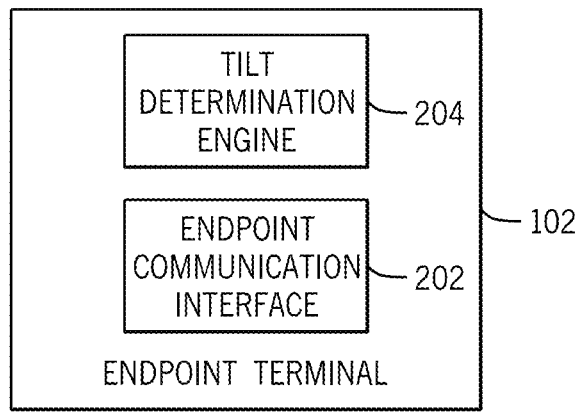
FIG. 18 is a block diagram illustrating components of an endpoint terminal in accordance with embodiments of the present disclosure.

FIG. 18 illustrates components in block diagram of a non-limiting exemplary embodiment of an endpoint terminal 102 according to various aspects of the present disclosure. In some embodiments, the endpoint terminal 102 is a device that is installed at an end-user premises in order to provide access to the communication network to the end-user premises. As shown, the endpoint terminal 102 includes an endpoint communication interface 202. The endpoint communication interface 202 allows the endpoint terminal 102 to communicate with a satellite, such as the first satellite 104 (see FIG. 1). In some embodiments, the endpoint communication interface 202 may include a phased array antenna configured to communicate with the first satellite 104, for example, via the Ku band. In some embodiments, the endpoint terminal 102 may also include a local communication interface, such as an Ethernet interface, a Wi-Fi interface, or other interface that allows other devices at the endpoint premises to connect to the network via the endpoint terminal 102.

The endpoint terminal 102 further includes an antenna system tilt determination angle engine 204. The tilt determination angle engine may receive information regarding the latitude location for the endpoint terminal, a longitude location of the endpoint terminal, obstructions, geological features, population density, an altitude of the end point terminal, a load balancing analysis of the satellite constellation, one or more angles of inclination of the satellite constellation, a geographical cell to which the end point terminal belongs, and combinations thereof.

Actual embodiments of the illustrated devices will have more components included therein which are known to one of ordinary skill in the art. For example, each of the illustrated devices will have a power source, one or more processors, computer-readable media for storing computer-executable instructions, and so on. These additional components are not illustrated herein for the sake of clarity.

Figure 19:
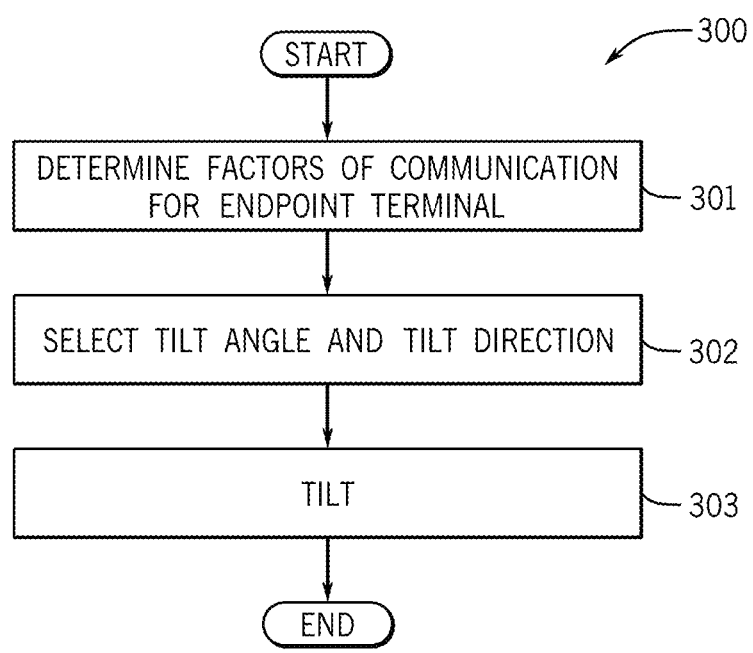
FIG. 19 is a flowchart illustrating a procedure for determining a tilting angle and tilting direction in accordance with embodiments of the present disclosure.

FIG. 19 is a flowchart that illustrates a non-limiting example embodiment of a procedure 300 for determining a tilting angle and tilting direction according to various aspects of the present disclosure. The procedure 300 is an example of a procedure suitable for use with the endpoint terminal 102 shown in FIG. 17 for orienting an endpoint terminal for communicating with a non-GEO satellite constellation. In some embodiments, the procedure 300 is executed recursively to adjust for changes in the satellite constellation, satellite communication loads, the endpoint terminal 202, or the endpoint terminal cell.

In block 301, the procedure includes determining the factors of communication for the endpoint terminal selected from the group consisting of the latitude location for the endpoint terminal, a longitude location of the endpoint terminal, obstructions, geological features, population density, an altitude of the end point terminal, a load balancing analysis of the satellite constellation, one or more angles of inclination of the satellite constellation, a geographical cell to which the end point terminal belongs, and combinations thereof.

In block 302, based on the factors of communication for the endpoint terminal, selecting a tilt angle and a tilt direction for the antenna system to adjust the field of regard from a non-tilted field of regard for a non-tilted antenna system to a tilted field of regard for a tilted antenna system, In block 303, tilting the antenna aperture to the selected tilt angle and tilt direction.

While illustrative embodiments have been illustrated and described, it will be appreciated that various changes can be made therein without departing from the spirit and scope of the disclosure.

The invention claimed is:

1. A method of communicating with a non-GEO satellite constellation, the method comprising:

positioning a satellite of the non-GEO satellite constellation to travel along a first orbital path at a first, non-zero-degree inclination, wherein the first orbital path defines an upper and a lower limiting latitude, and wherein the upper or lower limiting latitude have a reduced overlap with the GEO-belt interference zone as compared to a satellite traveling along a second orbital path at a zero-degree inclination;

selecting an orientation for an endpoint terminal configured for communicating with the satellite, wherein the endpoint terminal includes an electronically steered phased array antenna system defining a field of regard for a single steerable beam for communication with the non-GEO satellite constellation including the satellite, wherein the field of regard is a limited field of regard having a first end and a second end, and wherein the orientation directs the field of regard towards the upper or lower limiting latitude;

positioning the endpoint terminal to the selected orientation such that the endpoint terminal can communicate with the satellite while the satellite is at the upper or lower limiting latitude.

2. The method of claim 1, wherein the satellite constellation includes a plurality of satellites in low Earth orbit (LEO).

3. The method of claim 1, wherein the endpoint terminal includes a tilting mechanism configured to adjust the positioning of the endpoint terminal.

4. The method of claim 1, wherein positioning the endpoint terminal to the selected orientation includes tilting the endpoint terminal from a first position to a second position.

5. The method of claim 1, wherein positioning the endpoint terminal to the selected orientation includes directing the field of regard towards the upper limiting latitude when the endpoint terminal is located in the northern hemisphere.

6. The method of claim 1, wherein positioning the endpoint terminal to the selected orientation includes directing the field of regard towards the lower limiting latitude when the endpoint terminal is located in the southern hemisphere.

* * * * *